United States Patent
Miki et al.

(10) Patent No.: US 10,371,552 B2
(45) Date of Patent: Aug. 6, 2019

(54) PHYSICAL QUANTITY DETECTION DEVICE

(71) Applicant: HITACHI AUTOMOTIVE SYSTEMS, LTD., Hitachinaka-shi, Ibaraki (JP)

(72) Inventors: Takahiro Miki, Hitachinaka (JP); Hiroaki Hoshika, Hitachinaka (JP); Takayuki Yogo, Hitachinaka (JP); Takahiro Yamamoto, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 294 days.

(21) Appl. No.: 15/532,170

(22) PCT Filed: Nov. 2, 2015

(86) PCT No.: PCT/JP2015/080870
§ 371 (c)(1),
(2) Date: Jun. 1, 2017

(87) PCT Pub. No.: WO2016/092984
PCT Pub. Date: Jun. 16, 2016

(65) Prior Publication Data
US 2017/0268916 A1   Sep. 21, 2017

(30) Foreign Application Priority Data
Dec. 8, 2014 (JP) .................................. 2014-247862

(51) Int. Cl.
*G01F 1/684* (2006.01)
*G01M 15/04* (2006.01)
(Continued)

(52) U.S. Cl.
CPC ............ *G01F 1/684* (2013.01); *G01F 1/6842* (2013.01); *G01F 5/00* (2013.01); *G01F 15/14* (2013.01); *G01M 15/042* (2013.01)

(58) Field of Classification Search
None
See application file for complete search history.

(56) References Cited

U.S. PATENT DOCUMENTS

| 7,555,944 B2 | 7/2009 | Nakano et al. |
| 8,640,538 B2 | 2/2014 | Kono et al. |
| (Continued) |

FOREIGN PATENT DOCUMENTS

| JP | 2012-047660 A | 3/2012 |
| JP | 4975972 B2 | 7/2012 |
| (Continued) |

OTHER PUBLICATIONS

Extended European Search Report dated Jul. 20, 2018 for the European Patent Application No. 15868256.7.

*Primary Examiner* — Andre J Allen
(74) *Attorney, Agent, or Firm* — Volpe and Koenig, P.C.

(57) ABSTRACT

To improve measurement stability of a flow rate detection unit in a physical quantity detection device, a periphery of a synthetic resin material is provided with a protruding section protruding to a cover side. A physical quantity detection device includes a housing, a front cover fixed to the housing, a circuit board housed in the housing, a flow rate detection unit that detects, in a sub-path, the flow rate of a gas to be measured by being attached to the circuit board, a connecting wire that electrically connects the flow rate detection unit to the circuit board, and a synthetic resin material that seals a connecting wire-included connection portion between the circuit board and the flow rate detection unit, the front cover having a protruding section covering at (Continued)

least a part of the synthetic resin material by protruding into the sub-path.

7 Claims, 36 Drawing Sheets

(51) Int. Cl.
  *G01F 5/00* (2006.01)
  *G01F 15/14* (2006.01)

(56) References Cited

U.S. PATENT DOCUMENTS

| | | |
|---|---|---|
| 2002/0069699 A1 | 6/2002 | Sato et al. |
| 2003/0233886 A1 | 12/2003 | Uramachi et al. |
| 2015/0122012 A1* | 5/2015 | Tokuyasu ............ G01F 1/6842 |
| | | 73/204.22 |
| 2015/0160054 A1 | 6/2015 | Tashiro et al. |
| 2015/0168193 A1 | 6/2015 | Morino et al. |
| 2015/0185058 A1* | 7/2015 | Morino ............... G01F 1/6842 |
| | | 73/204.11 |
| 2015/0185060 A1* | 7/2015 | Tokuyasu ............ G01F 1/6842 |
| | | 73/204.21 |
| 2015/0187708 A1* | 7/2015 | Tashiro ............... F02D 41/187 |
| | | 257/467 |
| 2015/0192441 A1* | 7/2015 | Tokuyasu ............ G01F 1/6842 |
| | | 73/202.5 |
| 2015/0355006 A1* | 12/2015 | Tashiro ............... G01F 1/684 |
| | | 73/204.21 |

FOREIGN PATENT DOCUMENTS

| | | |
|---|---|---|
| JP | 5220955 B2 | 6/2013 |
| JP | 2014-001929 A | 1/2014 |
| JP | 2014-001954 A | 1/2014 |
| JP | 2014-071032 A | 4/2014 |

* cited by examiner

IIIe—IIIe

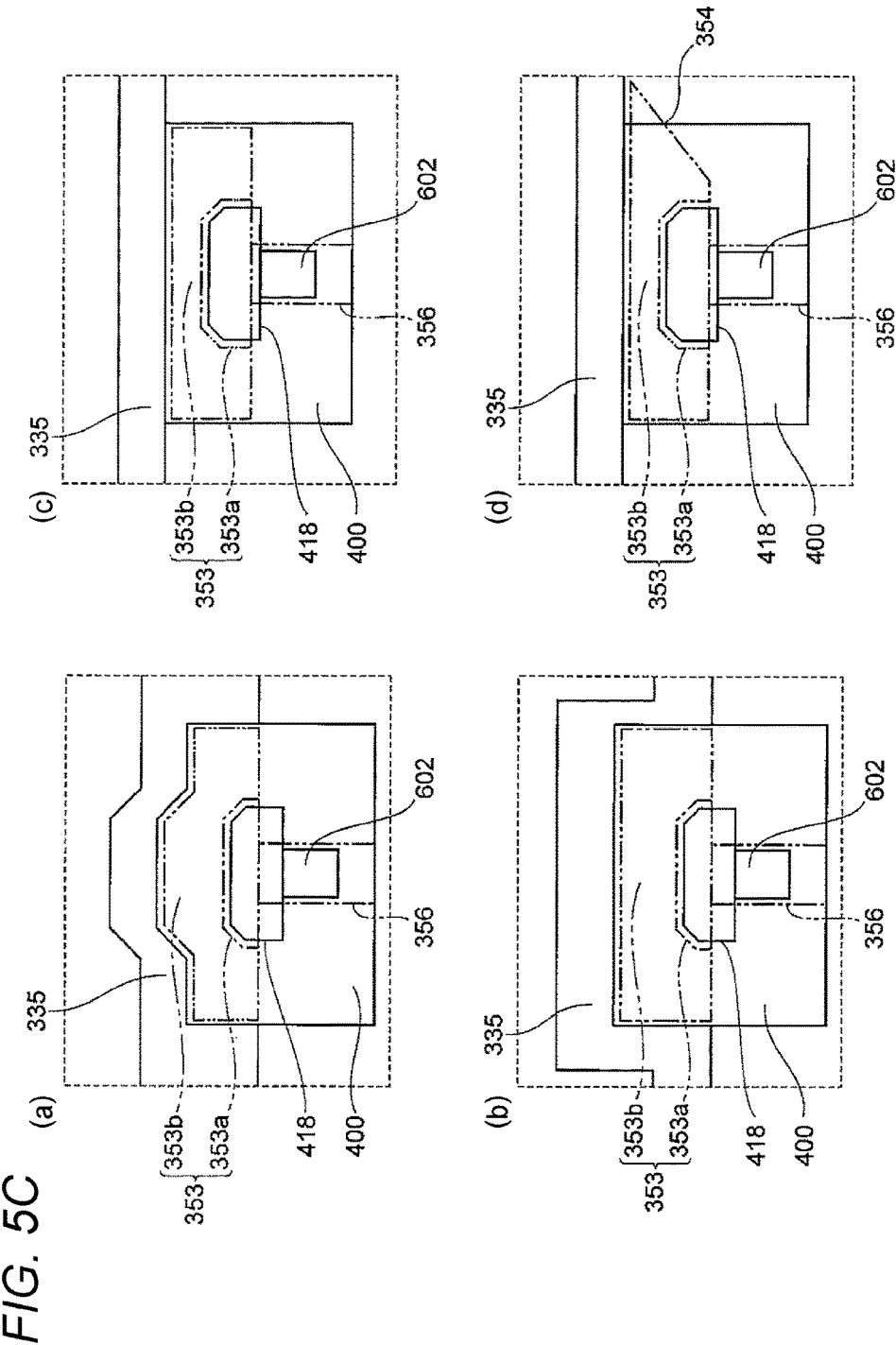

VIIb—VIIb

VIIe—VIIe

VIIe—VIIe

VIIg—VIIg (a)

(b)

VIIIa—VIIIa (a)

(b)

VIIIb—VIIIb (a)

(b)

VIIIc—VIIIc

IXc—IXc (a) BEFORE CUTTING (b) AFTER CUTTING

PHYSICAL QUANTITY DETECTION DEVICE

TECHNICAL FIELD

The present invention relates to a physical quantity detection device for detecting the physical quantity of intake air taken into an internal combustion engine, for example.

BACKGROUND ART

PTL 1 shows the structure of an air flow rate measuring device. In the air flow rate measuring device, a sensing element for measuring a physical quantity is provided on a circuit substrate on which a circuit portion is formed. The circuit portion of the circuit substrate is disposed in a case. The sensing element of the circuit substrate is exposed into a bypass passage. In PTL 1, the sensing element of the circuit substrate is electrically joined by a metal wire, and a joined portion is sealed with a synthetic resin material.

CITATION LIST

Patent Literature

PTL 1: JP 2012-47660 A

SUMMARY OF INVENTION

Technical Problem

As shown in PTL 1, when the electrically joined portion of the sensing element is exposed into the bypass passage, the electrically joined portion is generally protected by the synthetic resin material in order to protect the electrically joined portion from pollution products and water droplets or the like which are contained in air. However, the synthetic resin material usually has fluidity until the synthetic resin material is applied by a dispenser or the like and cured, which causes difficult shape management. Therefore, variations in shape cause a change in air flow around the sensing element, which may cause degradation in measurement stability. Therefore, it is necessary to reduce the influence of a change in the shape of the synthetic resin material on the air flow.

The present invention has been made in view of the above problem. An object of the present invention is to provide a physical quantity detection device which can reduce the influence of a change in the shape of a synthetic resin material on air flow.

Solution to Problem

In order to solve the problem, a physical quantity detection device of the present invention is a physical quantity detection device for detecting a physical quantity of a measurement target gas passing through a main passage. The physical quantity detection device includes: a housing inserted into the main passage; a cover fixed to the housing to constitute a bypass passage into which apart of the measurement target gas flows from the main passage in cooperation with the housing; a circuit substrate accommodated in the housing to be exposed into the bypass passage; a sensor element attached to the circuit substrate to detect a flow rate of the measurement target gas in the bypass passage; a connection wire electrically connecting the sensor element to the circuit substrate; and a synthetic resin material applied to a connected portion of the sensor element including the connection wire and the circuit substrate and cured to seal the connected portion. The cover includes a protrusion protruding into the bypass passage to cover at least a part of the synthetic resin material.

Advantageous Effects of Invention

The present invention can reduce the influence of the fluid variation of a measurement target gas due to variations in the shape of a synthetic resin material in a simple structure. Problems, configurations, and effects other that those described above will become apparent from the following description of embodiments.

BRIEF DESCRIPTION OF DRAWINGS

FIG. 5C is an enlarged view of a dotted line portion Vc of FIG. 3A.

DESCRIPTION OF EMBODIMENTS

Figure 1:
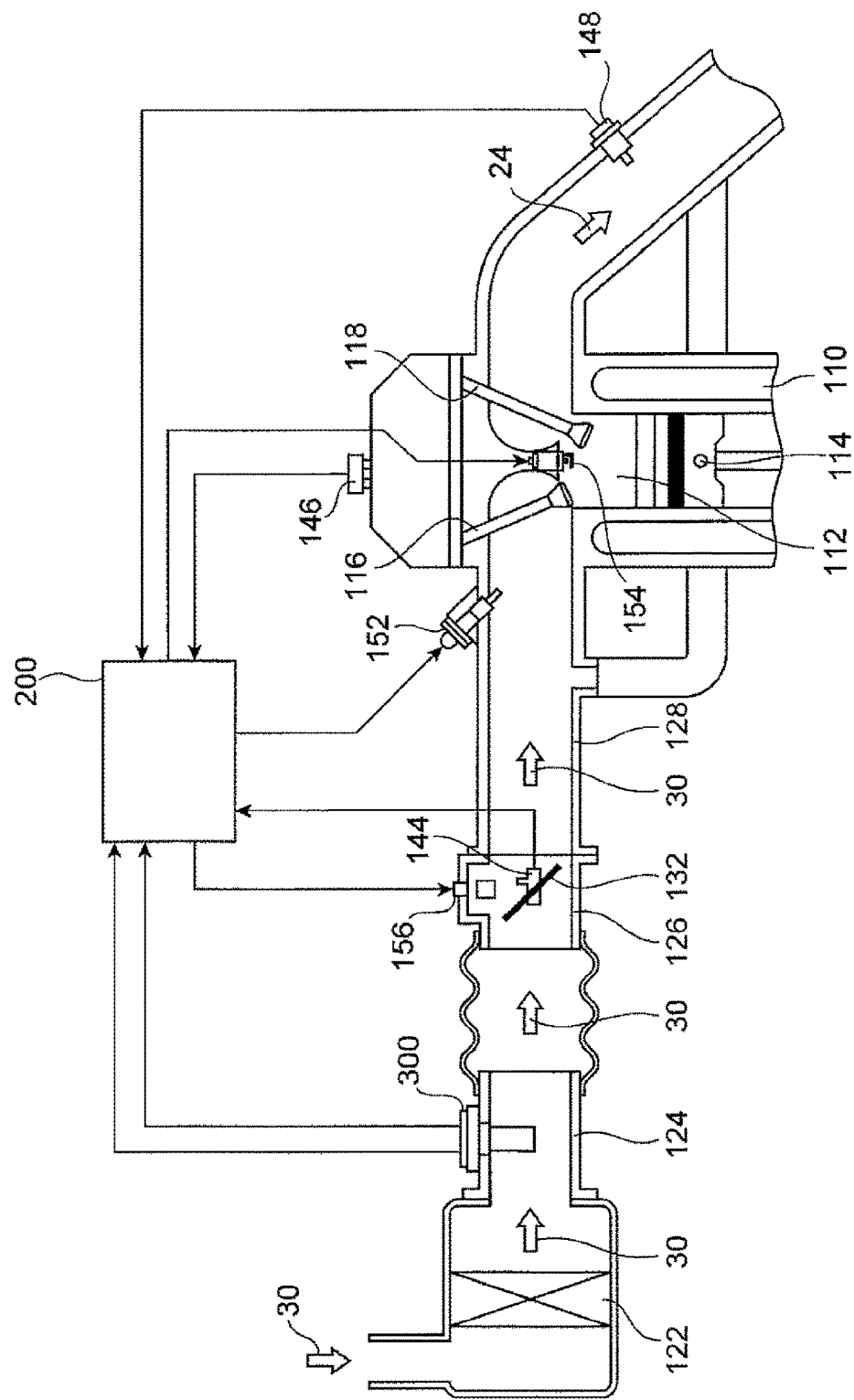
FIG. 1 is a system diagram illustrating one embodiment using a physical quantity detection device according to the present invention for an internal combustion engine control system.

Embodiments for practicing the invention described below (hereinafter, embodiments) solve various problems required as a practical product. In particular, the embodiments solve various problems for use in a detection device for detecting the physical quantity of an intake air of a vehicle, and exhibit various effects. One of various problems solved by the following embodiments is described in the "Problems to Be Solved by the Invention" described above, and one of various effects exhibited by the following embodiments is described in the "Effects of the Invention". Various problems solved by the following embodiments and various effects exhibited by the following embodiments will be further described in the following "Description of Embodiments". Therefore, it would be appreciated that the following embodiments also include other effects or problems obtained or solved by the embodiments than those described in "Problems to Be Solved by the Invention" or "Effects of the Invention".

In the following embodiments, like reference numerals denote like elements even when they are inserted in different drawings, and they have the same functional effects. The components that have been described in previous paragraphs may be omitted by denoting reference numerals and signs in the drawings.

1. Internal Combustion Engine Control System Having Physical Quantity Detection Device 300 According to One Embodiment of the Invention FIG. 1 is a system diagram illustrating an electronic fuel injection type internal combustion engine control system using a physical quantity detection device 300 according to one embodiment of the invention. Based on the operation of an internal combustion engine 110 having an engine cylinder 112 and an engine piston 114, an intake air as a measurement target gas 30 is inhaled from an air cleaner 122 and is guided to a combustion chamber of the engine cylinder 112 through a main passage 124 including, for example, an intake body, a throttle body 126, and an intake manifold 128. The physical quantity of the measurement target gas 30 as an intake air guided to the combustion chamber is measured by the physical quantity detection device 300 according to the invention. A fuel is supplied from a fuel injection valve 152 based on the detected physical quantity, and is mixed with the measurement target gas 30, so that the mixed gas is guided to the combustion chamber. In this embodiment, the fuel injection valve 152 is provided in an intake port of the internal combustion engine, and the fuel injected to the intake port is mixed with the measurement target gas 30 as an intake air to form a mixed gas, so that the mixed gas is guided to the combustion chamber through an intake valve 116 to generate mechanical energy by burning.

The fuel and the air guided to the combustion chamber have a fuel/air mixed state, and are explosively combusted by the spark ignition of an ignition plug 154 to generate mechanical energy. The gas after combustion is guided to an exhaust pipe from an exhaust valve 118, and is discharged to the outside of the vehicle from the exhaust pipe as an exhaust gas 24. The flow rate of the measurement target gas 30 as an intake air guided to the combustion chamber is controlled by a throttle valve 132 of which opening level changes based on the manipulation of an accelerator pedal. The fuel supply amount is controlled based on the flow rate of the intake air guided to the combustion chamber, and a driver controls the opening level of the throttle valve 132, so that the flow rate of the intake air guided to the combustion chamber is controlled. As a result, it is possible to control mechanical energy generated by the internal combustion engine.

1.1 Overview of Control of Internal Combustion Engine Control System

Physical quantities such as the flow rate, the temperature, the humidity, and the pressure of the measurement target gas 30 as an intake air which is input from the air cleaner 122 and flows through the main passage 124 are detected by the physical quantity detection device 300, and an electric signal representing the physical quantity of the intake air is input to a control device 200 from the physical quantity detection device 300. The output of a throttle angle sensor 144 which measures the opening level of the throttle valve 132 is input to the control device 200, and the output of a rotation angle sensor 146 is input to the control device 200 to measure the position or the condition of the engine piston 114, the intake valve 116, or the exhaust valve 118 of the internal combustion engine and the rotational speed of the internal combustion engine. In order to measure a mixed ratio state between the fuel amount and the air amount from the condition of the exhaust gas 24, the output of an oxygen sensor 148 is input to the control device 200.

The control device 200 computes a fuel injection amount or an ignition timing based on the physical quantity of the intake air as the output of the physical quantity detection device 300 and the rotational speed of the internal combustion engine measured based on the output of the rotation angle sensor 146. Based on the computation results, a fuel amount supplied from the fuel injection valve 152 and an ignition timing for igniting the ignition plug 154 are controlled. In practice, the fuel supply amount or the ignition timing is further accurately controlled based on the change state of the temperature or the throttle angle detected by the physical quantity detection device 300, the change state of the engine rotation speed, and the air-fuel ratio state measured by the oxygen sensor 148. In the idle driving state of the internal combustion engine, the control device 200 further controls the air amount bypassing the throttle valve 132 using an idle air control valve 156, and controls the rotation speed of the internal combustion engine under the idle driving state.

1.2 Importance of Improvement of Detection Accuracy of Physical Quantity Detection Device 300 and Environment for Mounting Physical Quantity Detection Device Both the fuel supply amount and the ignition timing as a main control amount of the internal combustion engine are computed by using the output of the physical quantity detection device 300 as a main parameter. Therefore, improvement of the detection accuracy, suppression of aging, and improvement of reliability of the physical quantity detection device 300 are important for improvement of control accuracy of a vehicle or obtainment of reliability.

In particularly, in recent years, there are a lot of demands for fuel saving of vehicles and exhaust gas purification. In order to satisfy such demands, it is significantly important to improve the detection accuracy of the physical quantity of an intake air detected by the physical quantity detection device 300. It is also important to maintain the high reliability of the physical quantity detection device 300.

A vehicle having the physical quantity detection device 300 is used under an environment where a temperature or humidity change is significant. It is desirable that the physical quantity detection device 300 is designed to consider a countermeasure for the temperature or humidity change or a countermeasure for dust or pollutants under such a use environment.

The physical quantity detection device 300 is installed in the intake pipe influenced by heat from the internal combustion engine. For this reason, the heat generated from the internal combustion engine is transferred to the physical quantity detection device 300 via the intake pipe which is a main passage 124. Since the physical quantity detection device 300 detects the flow rate of the measurement target gas 30 by transferring heat to the measurement target gas 30, it is important to suppress the influence of the heat from the outside as much as possible.

The physical quantity detection device 300 mounted on a vehicle solves the problems described in "Problems to Be Solved by the Invention" and exhibits the effects described in "Effects of the Invention" as described below. In addition, as described below, it solves various problems demanded as a product and exhibits various effects sufficiently considering various problems described above. Specific problems or specific effects that are solved or exhibited by the physical quantity detection device 300 will be described in the following description of embodiments.

2. Configuration of Physical Quantity Detection Device 300

2.1 Exterior Structure of Physical Quantity Detection Device 300

Figure 2A:
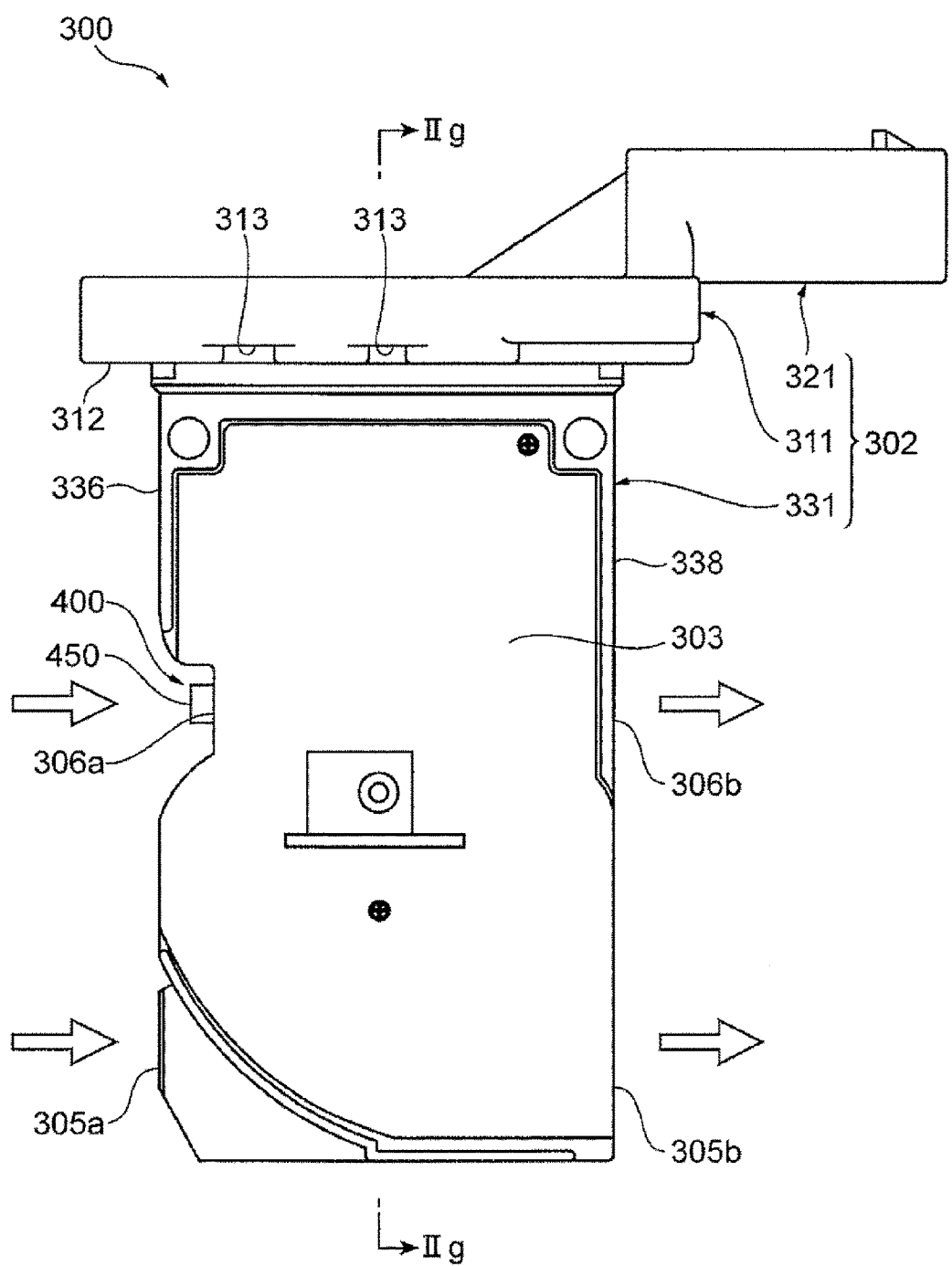
FIG. 2A is a front view of the physical quantity detection device.
Figure 2B:
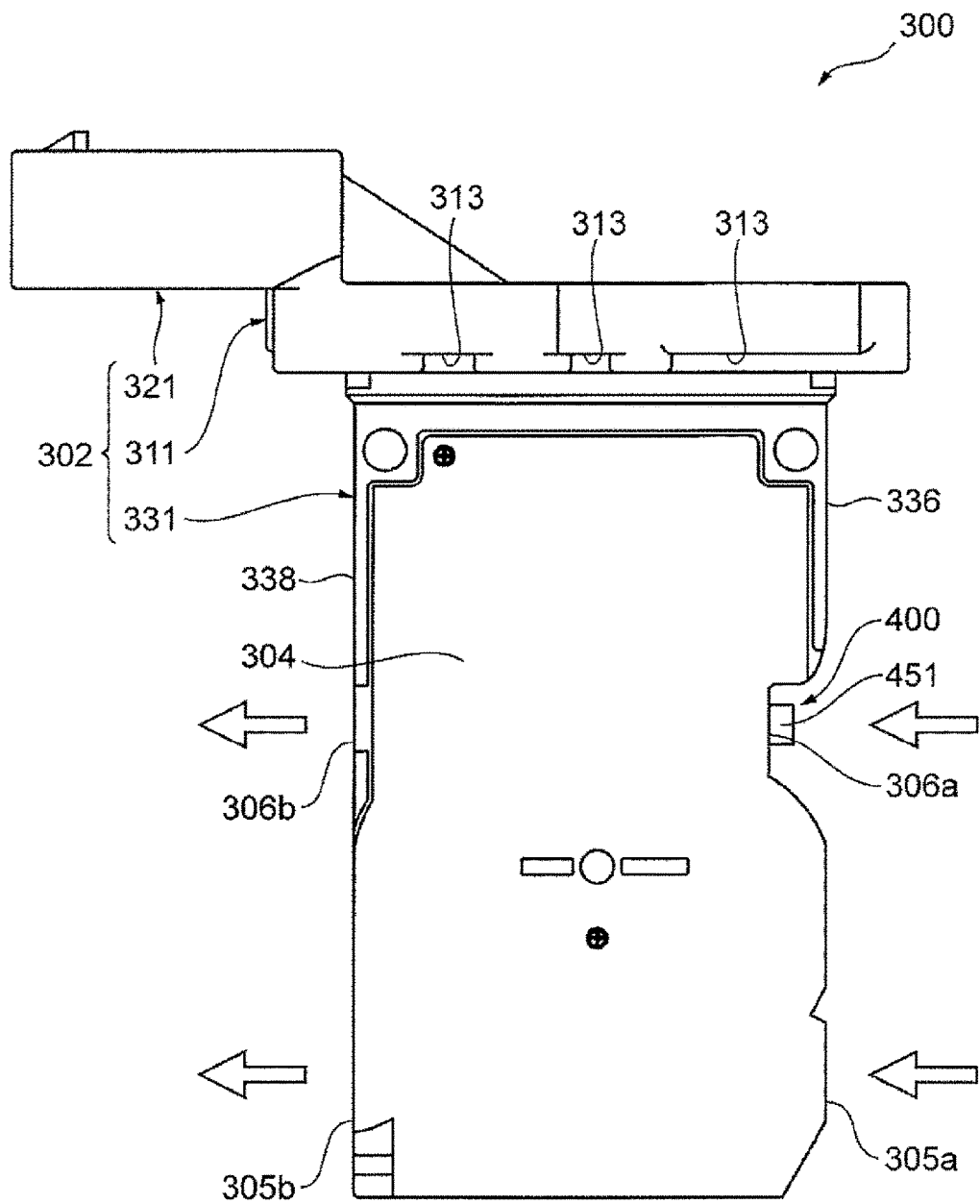
FIG. 2B is a rear view of the physical quantity detection device.
Figure 2C:
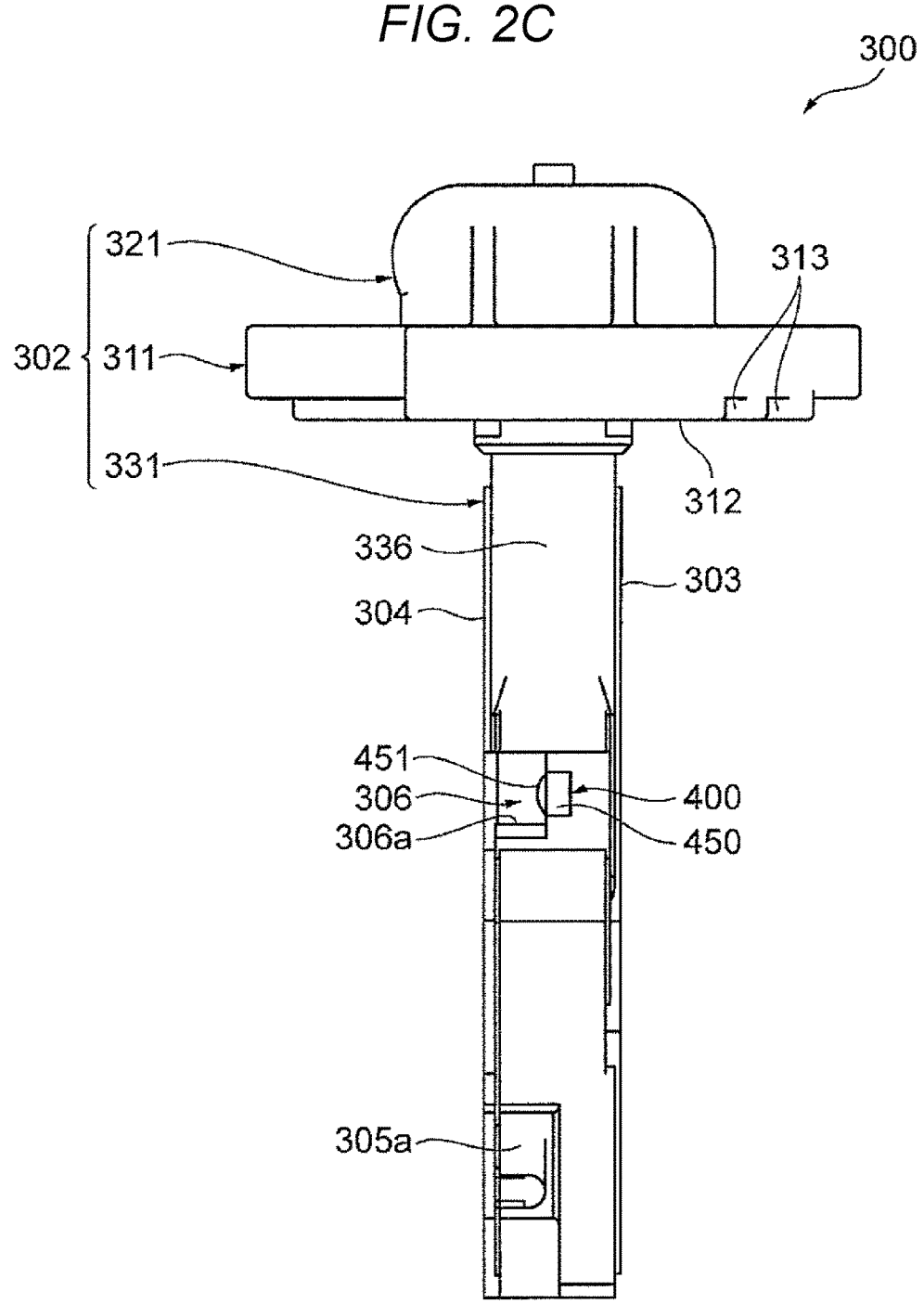
FIG. 2C is a left side view of the physical quantity detection device.
Figure 2D:
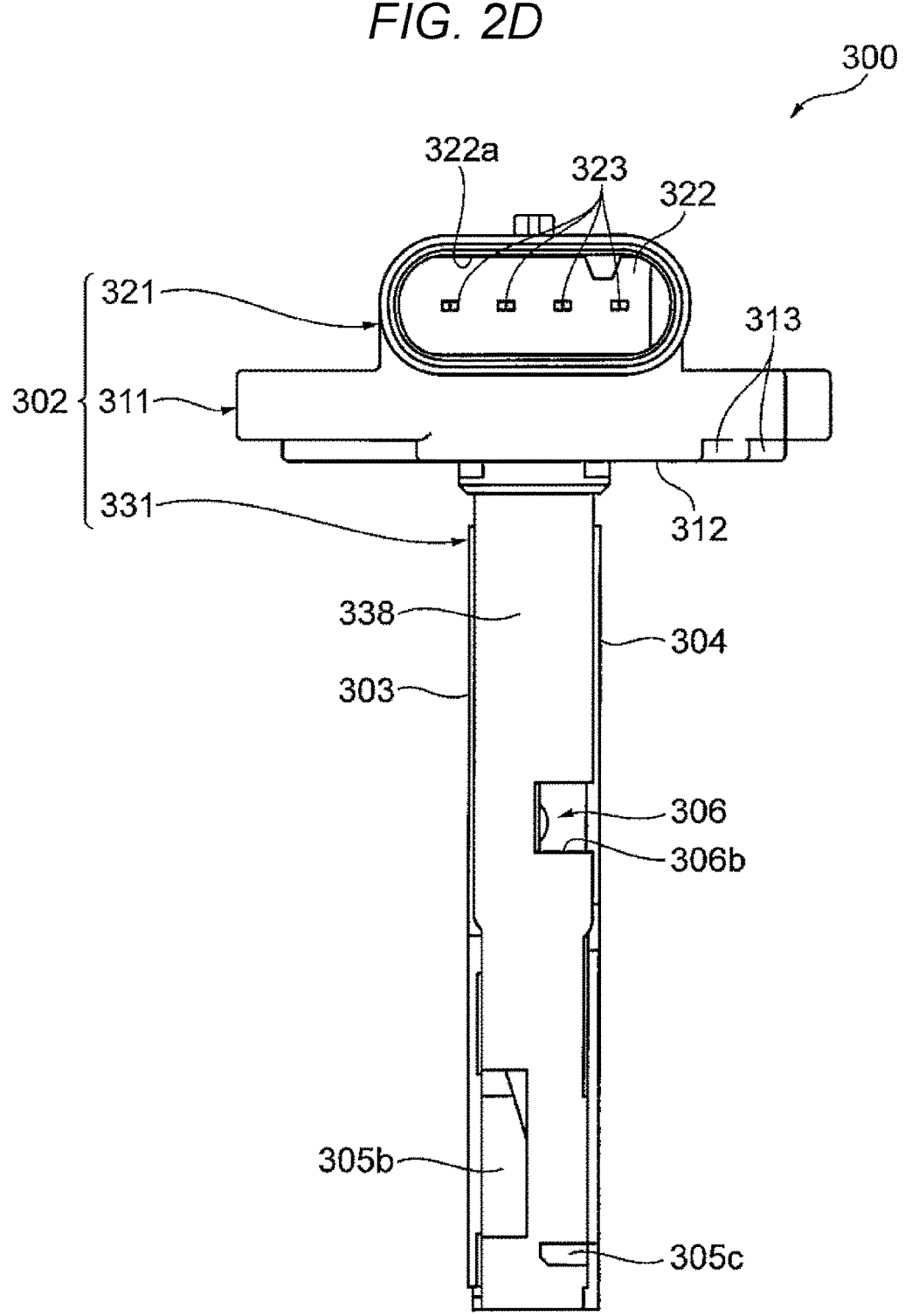
FIG. 2D is a right side view of the physical quantity detection device.
Figure 2E:
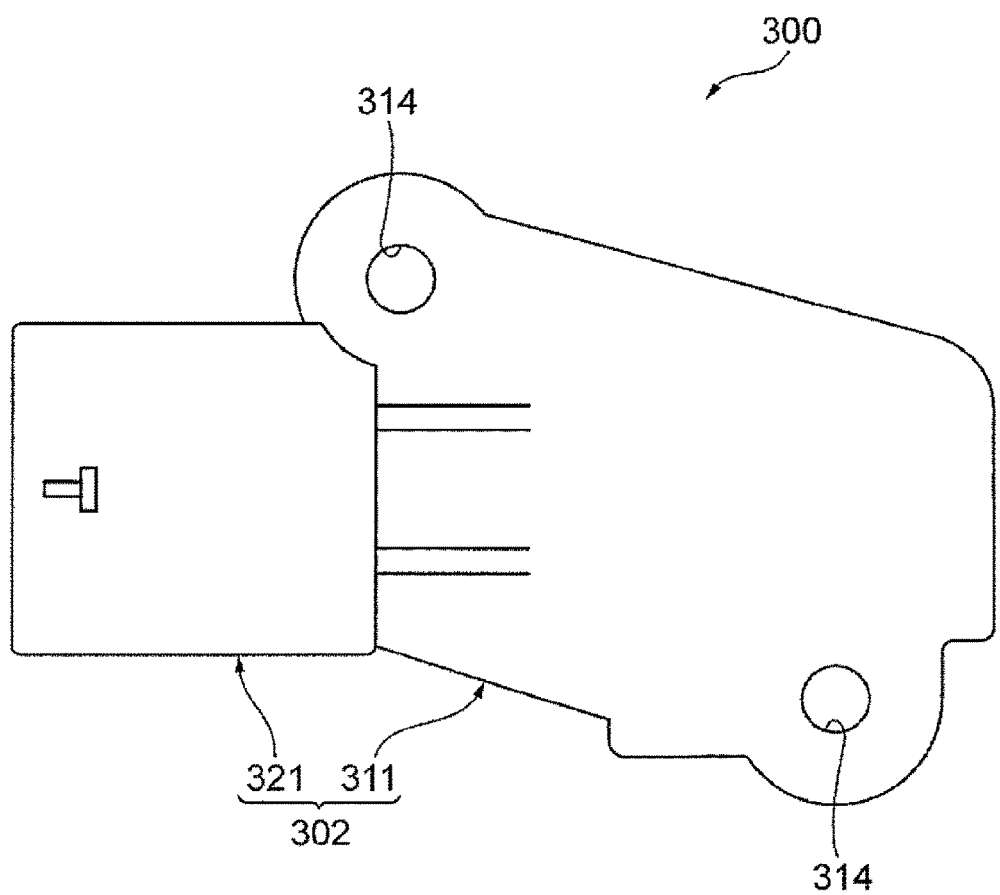
FIG. 2E is a plan view of the physical quantity detection device.
Figure 2F:
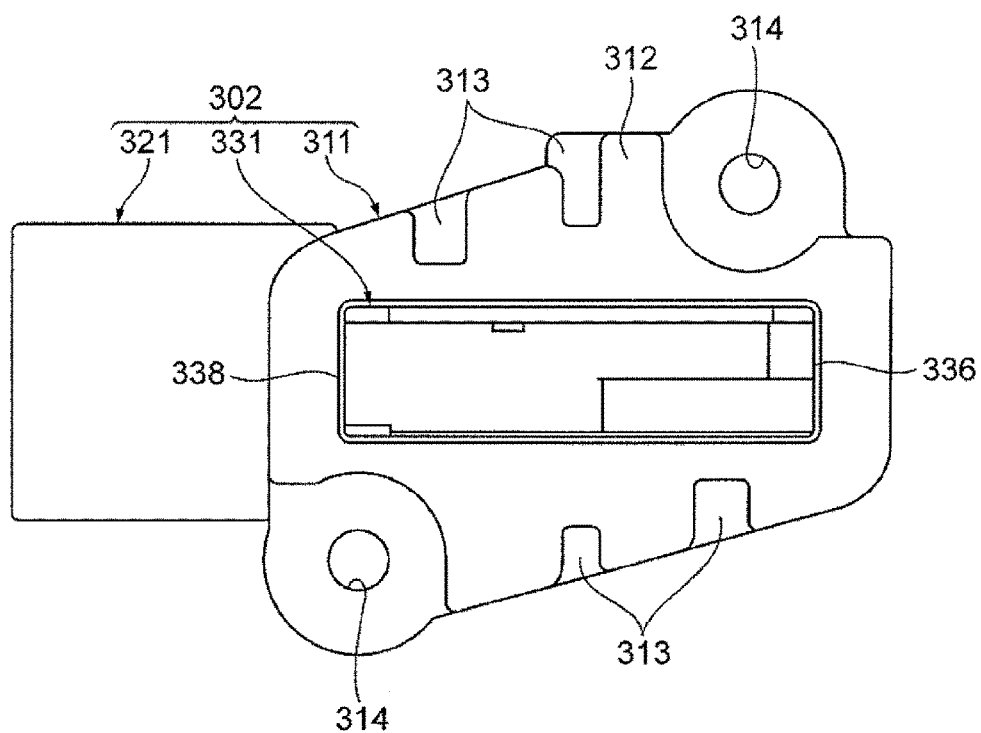
FIG. 2F is a bottom view of the physical quantity detection device.
Figure 2G:
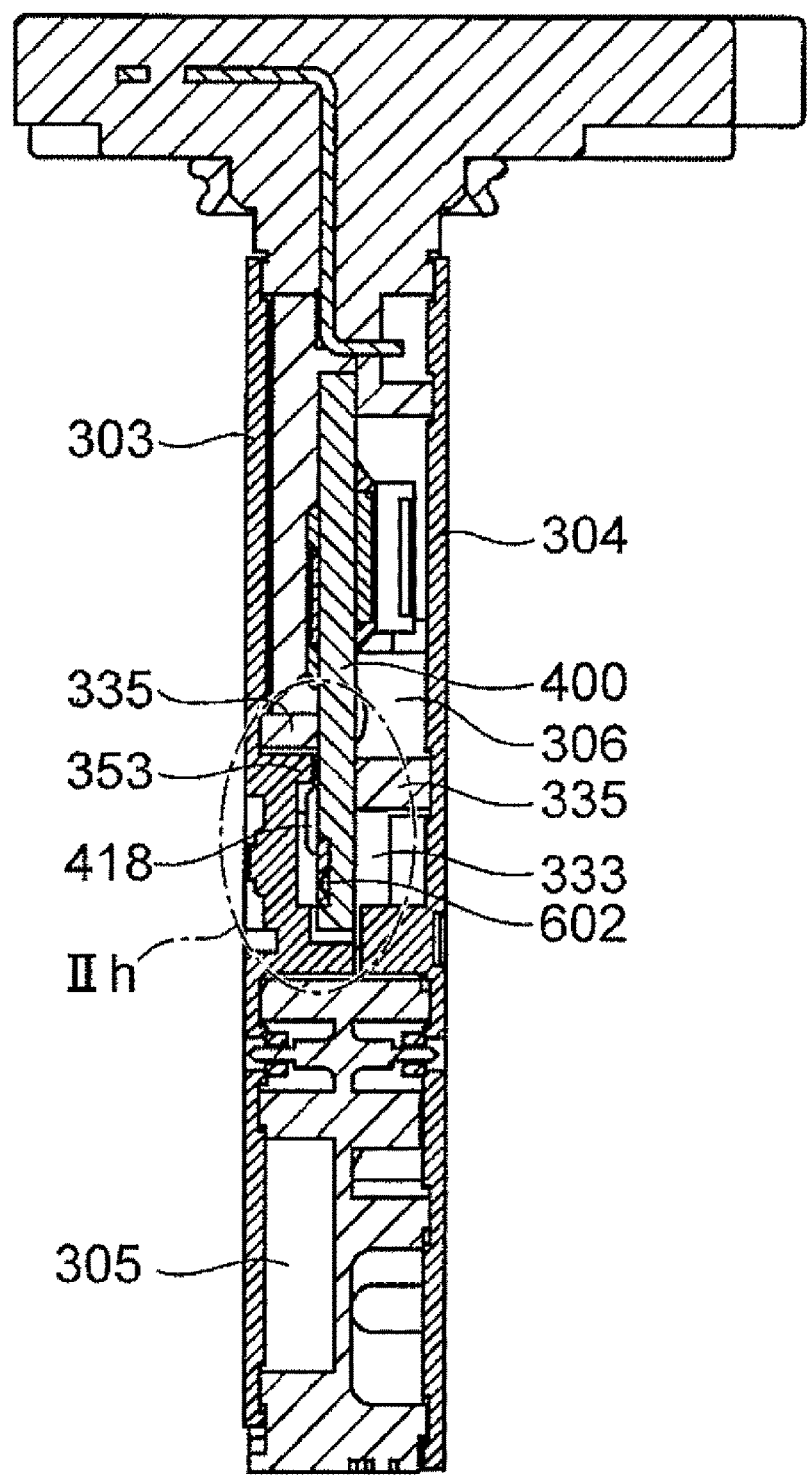
FIG. 2G is a IIg-IIg line sectional view of FIG. 2A.
Figure 2H:
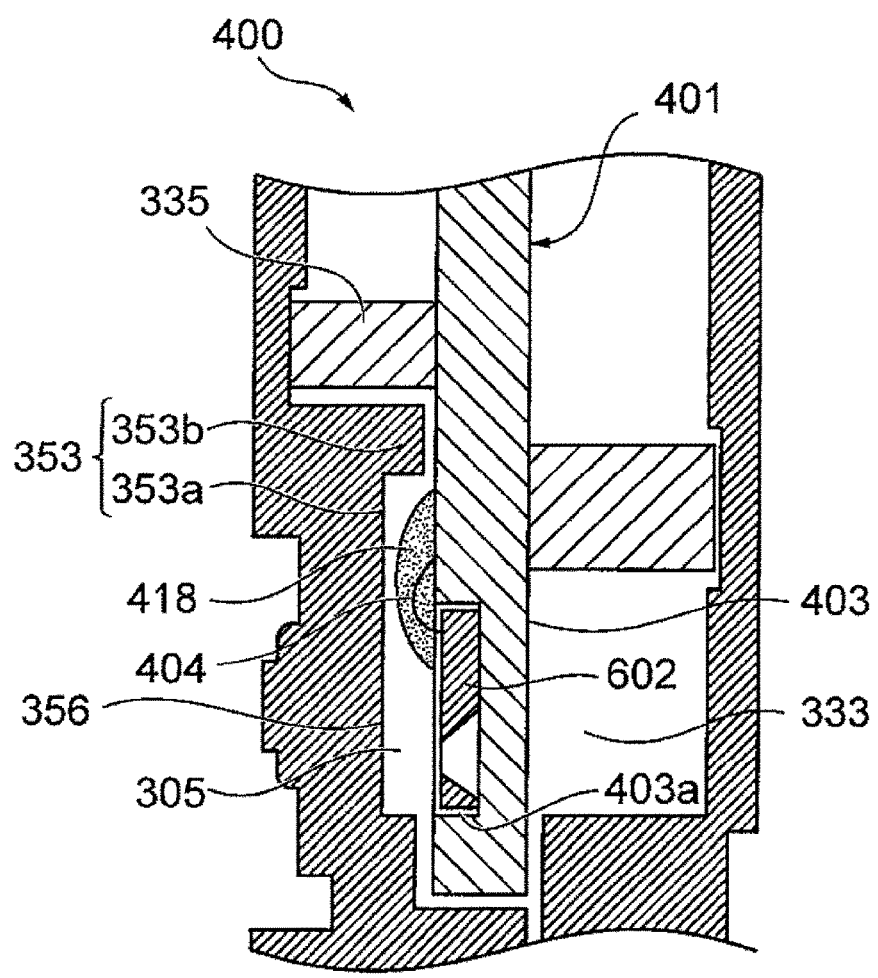
FIG. 2H is an enlarged view of a dotted line portion IIh of FIG. 2G.

FIGS. 2A to 2H are diagrams illustrating the exterior of the physical quantity detection device 300, in which FIG. 2A is a front view of the physical quantity detection device 300, FIG. 2B is a rear view, FIG. 2C is a left side view, FIG. 2D is a right side view, FIG. 2E is a plan view, FIG. 2F is a bottom view, FIG. 2G is a IIg-IIg line sectional view of FIG. 2A, and FIG. 2H is an enlarged view illustrating a main portion IIh of FIG. 2G.

The physical quantity detection device 300 includes a housing 302, a front cover 303, and a rear cover 304. The housing 302 is constituted by mold-forming a synthetic resin material. The housing 302 includes a flange 311 for fixing the physical quantity detection device 300 to an intake body as a main passage 124, an external connector 321 having a connector protruding from the flange 311 for electrical connection to external devices, and a measuring portion 331 extending so as to protrude toward the center of the main passage 124 from the flange 311.

Figure 3A:
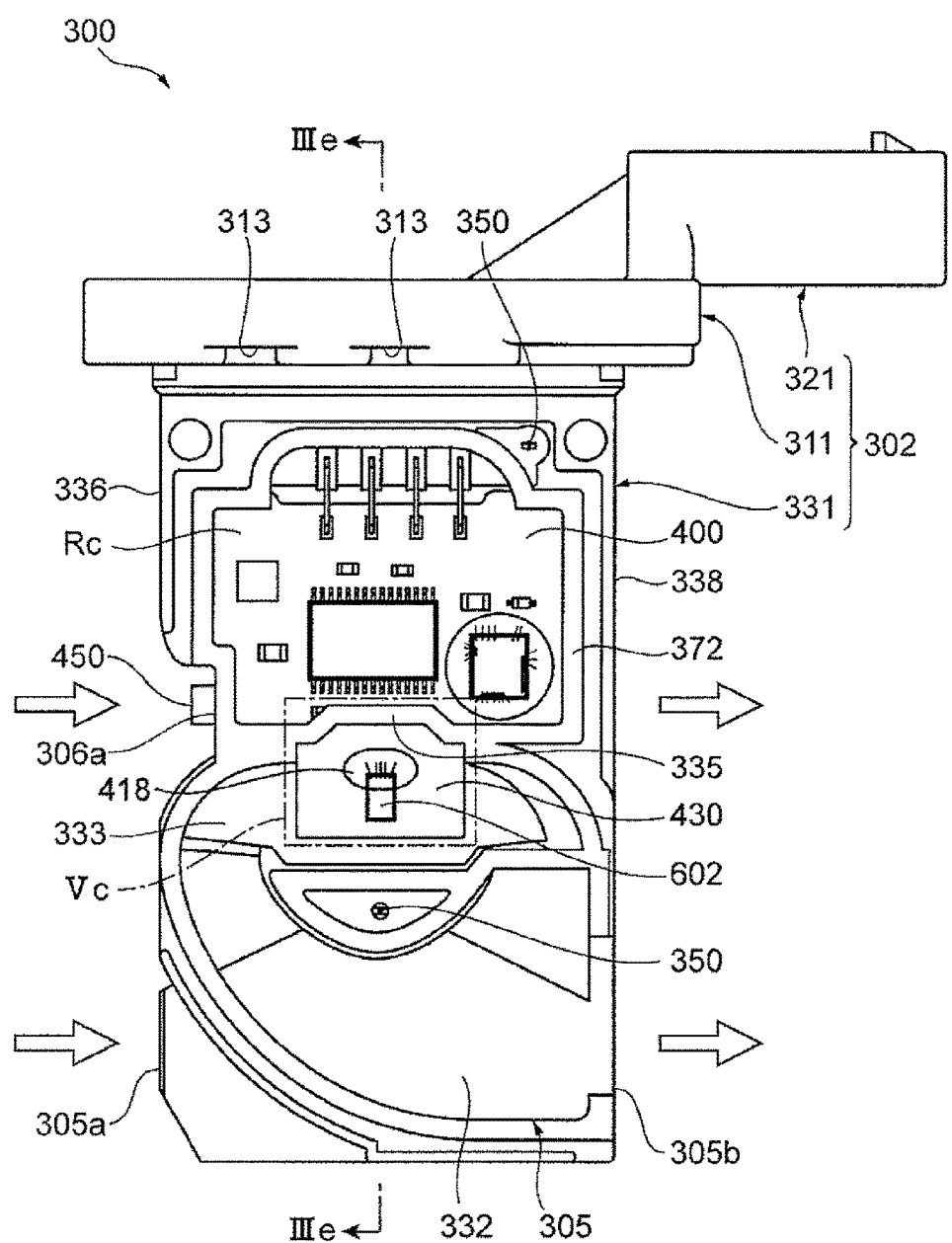
FIG. 3A is a front view illustrating a state where a front cover is removed from the physical quantity detection device.
Figure 3B:
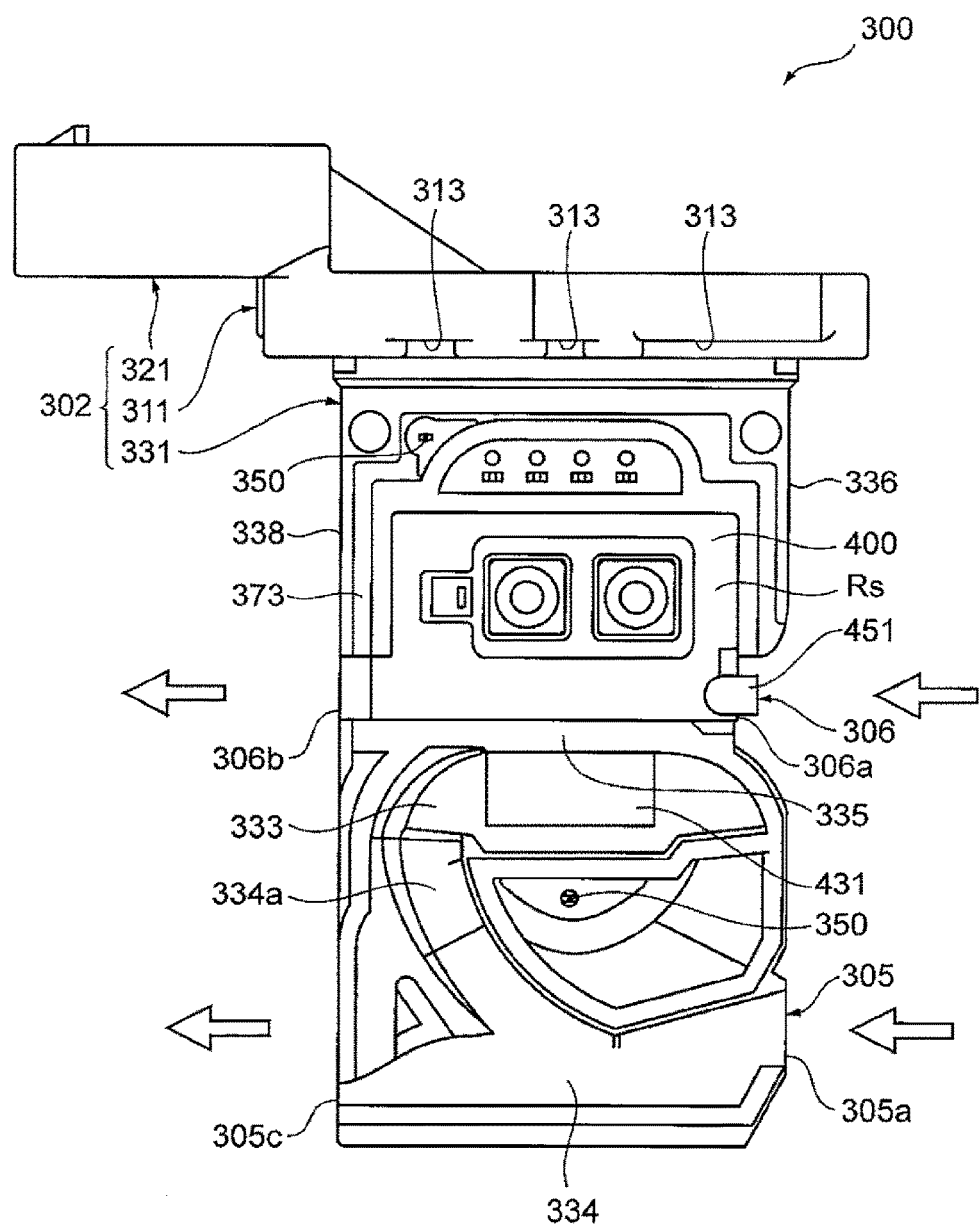
FIG. 3B is a rear view illustrating a state where a rear cover is removed from the physical quantity detection device.

When the housing 302 is mold-formed, a circuit substrate 400 is integrally provided on the measuring portion 331 by insert molding (see FIGS. 3A and 3B). The circuit substrate 400 includes at least one detecting portion for detecting the physical quantity of the measurement target gas 30 which flows through the main passage 124, and a circuit portion for processing a signal detected by the detecting portion. The detecting portion is disposed at a position exposed to the measurement target gas 30, and the circuit portion is disposed in a circuit chamber sealed with the front cover 303.

A bypass passage trench is provided on each of the surface and the rear surface of the measuring portion 331, and a first bypass passage 305 is formed by cooperation of the front cover 303 and the rear cover 304. A first bypass passage inlet port 305a for inputting a part of the measurement target gas 30 such as an intake air to the first bypass passage 305, and a first bypass passage outlet port 305b for returning the measurement target gas 30 from the first bypass passage 305 to the main passage 124 are provided in the leading end of the measuring portion 331. A part of the circuit substrate 400 protrudes in the first bypass passage 305, and a flow rate detection portion 602 (see FIG. 3A) as a detecting portion is disposed in the protruding portion, to detect the flow rate of the measurement target gas 30.

A secondary bypass passage 306 for inputting a part of the measurement target gas 30 such as an intake air to a sensor chamber Rs is provided in an intermediate portion of the measuring portion 331 located on the side of the flange 311 with respect to the first bypass passage 305. The secondary bypass passage 306 is formed by cooperation of the measuring portion 331 and the rear cover 304. The secondary bypass passage 306 includes a secondary bypass passage inlet port 306a opened in an upstream side outer wall 336 for inputting the measurement target gas 30, and a secondary passage outlet port 306b opened in a downstream side outer wall 338 in order to return the measurement target gas 30 to the main passage 124 from the secondary bypass passage 306. The secondary bypass passage 306 communicates with the sensor chamber Rs formed on the rear side of the measuring portion 331. A pressure sensor and a humidity sensor as a detecting portion provided on the rear surface of the circuit substrate 400 are disposed in the sensor chamber Rs.

2.2 Effects Based on Exterior Structure of Physical Quantity Detection Device 300

In the physical quantity detection device 300, the secondary bypass passage inlet port 306a is provided in the intermediate portion of the measuring portion 331 extending toward the center direction of the main passage 124 from the flange 311, and the first bypass passage inlet port 305a is provided in the leading end of the measuring portion 331. Therefore, the gas in the vicinity of the center portion distant from the inner wall surface instead of the vicinity of the inner wall surface of the main passage 124 may be input to the first bypass passage 305 and the secondary bypass passage 306. Therefore, the physical quantity detection device 300 can measure the physical quantity of the air distant from the inner wall surface of the main passage 124, so that a measurement error of heat or a physical quantity relating to a decrease of the flow velocity in the vicinity of the inner wall surface can be reduced.

While the measuring portion 331 has a shape extending along an axis directed to the center from the outer wall of the main passage 124, its width has a narrow shape as illustrated in FIGS. 2C and 2D. That is, the measuring portion 331 of the physical quantity detection device 300 has a front surface having an approximately rectangular shape and a side surface having a thin width. As a result, the physical quantity detection device 300 can have a first bypass passage 305 having a sufficient length, and it is possible to suppress a fluid resistance to a small value for the measurement target gas 30. For this reason, using the physical quantity detection device 300, it is possible to suppress the fluid resistance to a small value and measure the flow rate of the measurement target gas 30 with high accuracy.

2.3 Structure and Effects of Flange 311

The flange 311 includes a plurality of hollows 313 on its lower surface 312 opposed to the main passage 124, so as to reduce a heat transfer surface with the main passage 124 and make it difficult for the physical quantity detection device 300 to receive the influence of the heat (FIG. 2F). In the physical quantity detection device 300, the measuring portion 331 is inserted into the inside from an installation hole provided in the main passage 124 so that a lower surface 312 of the flange 311 is opposed to the main passage 124. The main passage 124 serves as, for example, an intake body, and is maintained at a high temperature in many cases. Conversely, it is conceived that the main passage 124 is maintained at a significantly low temperature when the operation is activated in a cold district. If such a high or low temperature condition of the main passage 124 affects the measurement of various physical quantities, the measurement accuracy is degraded. The flange 311 includes the hollows 313 on the lower surface 312, and a space is formed between the lower surface 312 opposed to the main passage 124 and the main passage 124. As a result, the flange 311 can reduce heat transfer from the main passage 124 to the physical quantity detection device 300 and prevent the degradation of the measurement accuracy caused by heat.

A screw hole 314 of the flange 311 is provided to fix the physical quantity detection device 300 to the main passage 124, and a space is formed between a surface opposed to the main passage 124 around each screw hole 314 and the main passage 124 such that the surface opposed to the main passage 124 around the screw hole 314 recedes from the main passage 124. As a result, the flange 311 has a structure capable of reducing heat transfer from the main passage 124 to the physical quantity detection device 300 and preventing the degradation of the measurement accuracy caused by heat.

2.4 Structure of External Connector 321

The external connector 321 includes a connector 322 provided on the upper surface of the flange 311 so as to protrude toward a downstream side in the flow direction of the measurement target gas 30 from the flange 311. An insertion hole 322a for inserting a telecommunication cable for connecting the connector 322 and the control device 200 to each other is provided in the connector 322. As illustrated in FIG. 2D, four external terminals 323 are provided in the insertion hole 322a. The external terminal 323 serves as a terminal for outputting information on the physical quantity as the measurement result of the physical quantity detection device 300, and a power terminal for supplying DC power for operating the physical quantity detection device 300.

The connector 322 protrudes toward a downstream side in the flow direction of the measurement target gas 30 from the flange 311. The connector 322 has such a shape that it is inserted toward the upstream side from the downstream side in the flow direction, but the shape of the connector 322 is not limited thereto. For example, the connector 322 may have such a shape that it is inserted along the extension direction of the measuring portion 331 so as to perpendicularly protrude from the upper surface of the flange 311. The shape of the connector 322 can be variously changed.

Figure 3C:
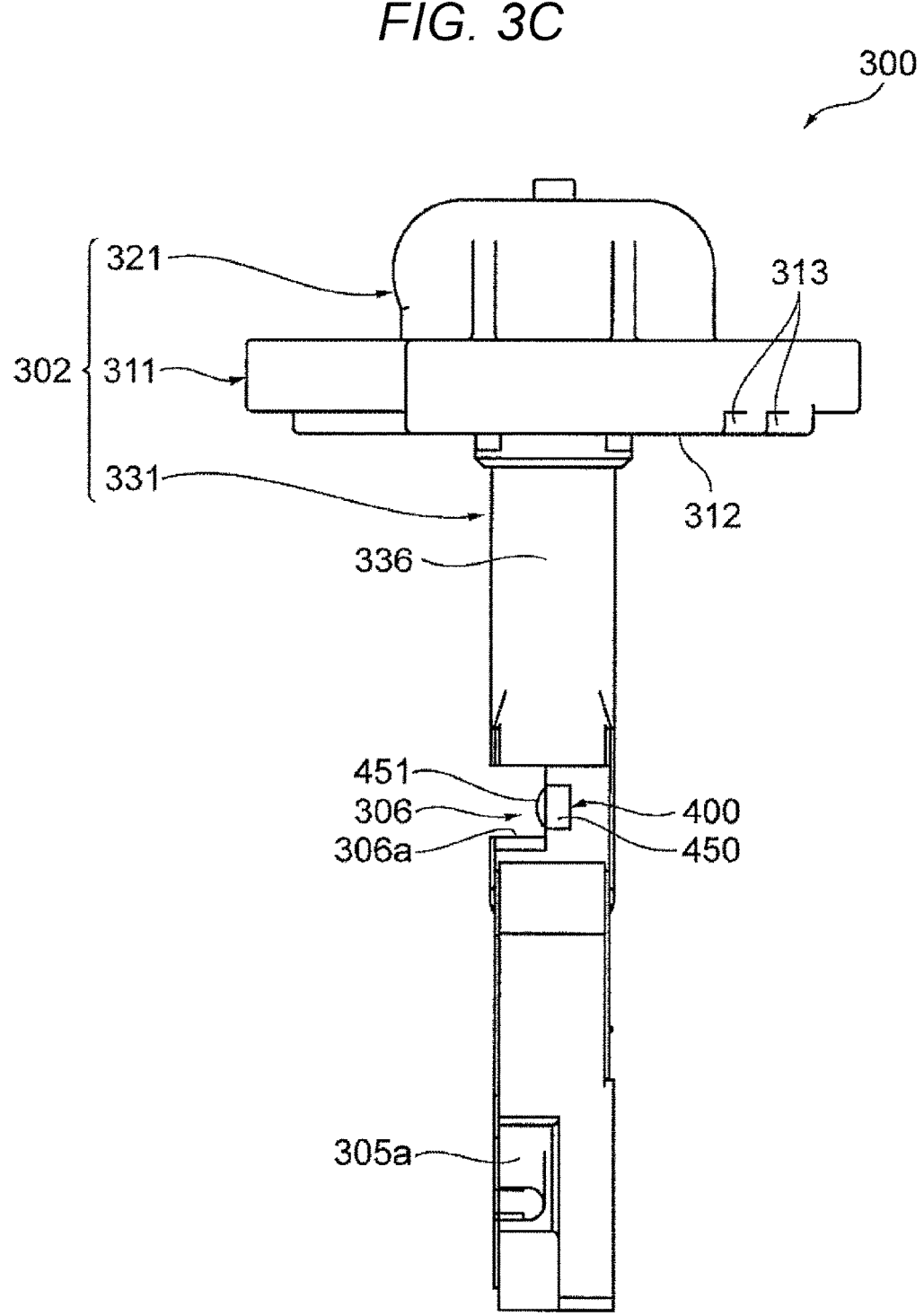
FIG. 3C is a left side view illustrating a state where the front cover and the rear cover are removed from the physical quantity detection device.
Figure 3D:
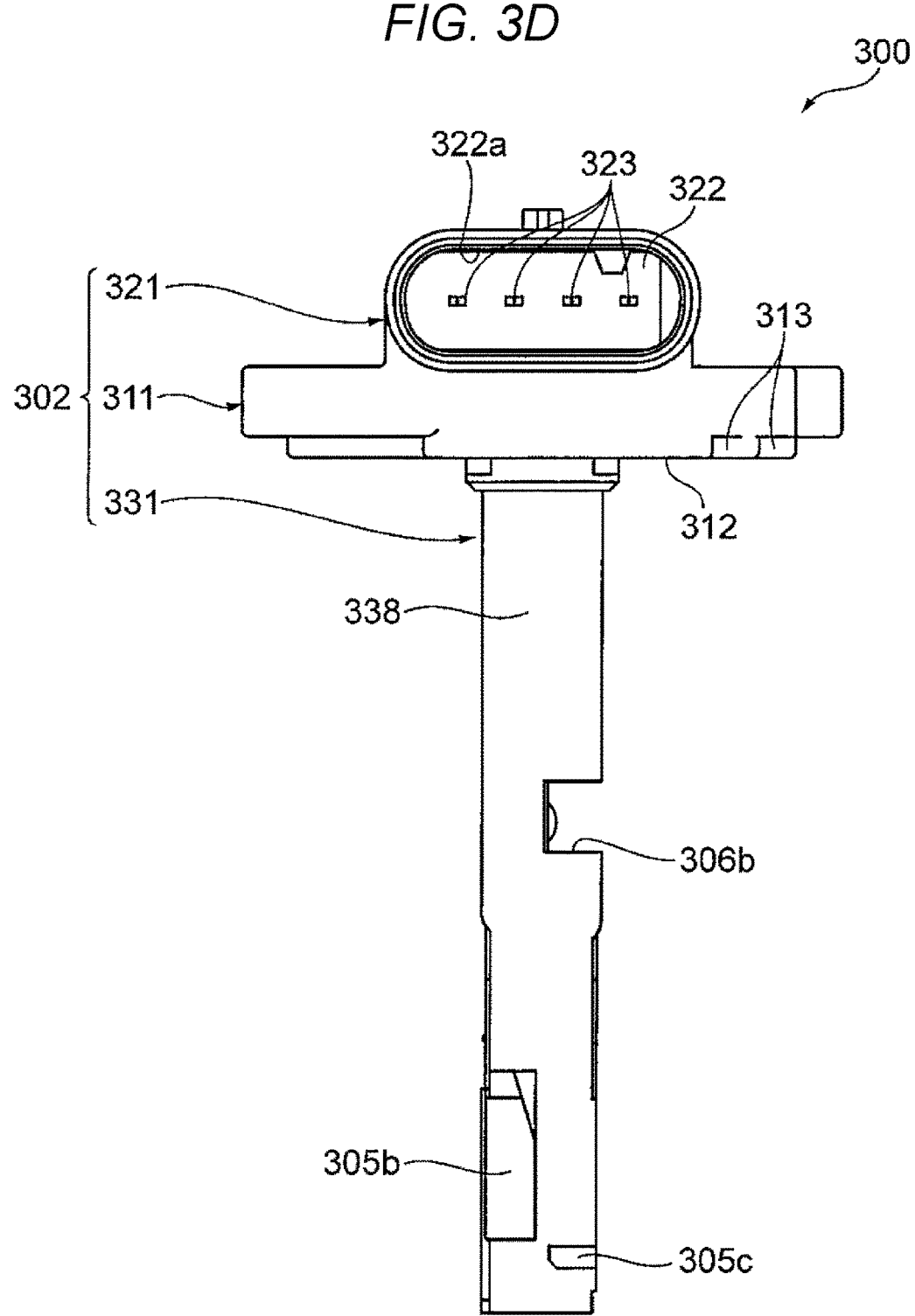
FIG. 3D is a right side view illustrating a state where the front cover and the rear cover are removed from the physical quantity detection device.
Figure 3E:
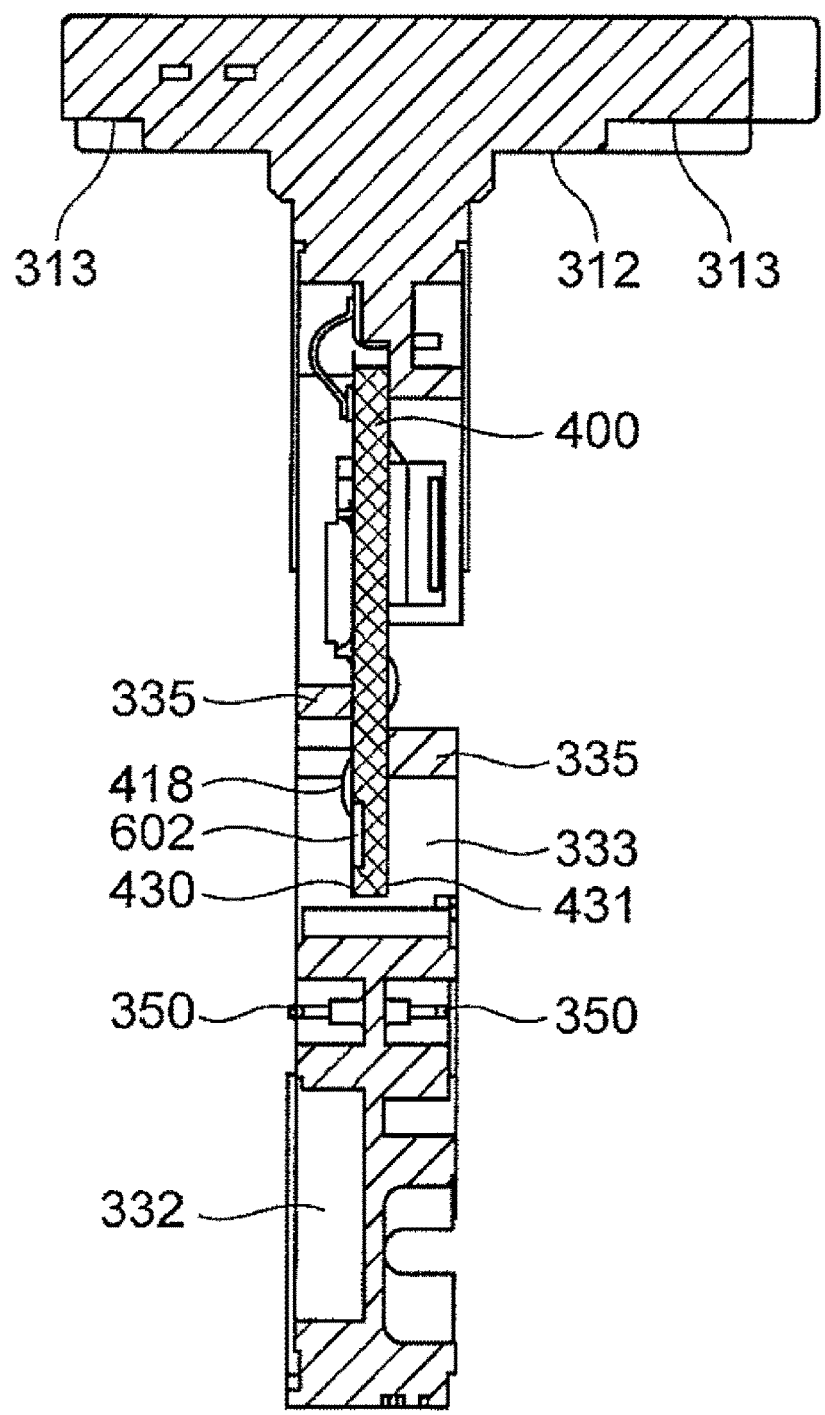
FIG. 3E is a IIIe-IIIe line sectional view of FIG. 3A.

3. Entire Structure of Housing 302 and its Effects 3.1 Structures and Effects of Bypass Passage and Flow Rate Detection Portion Next, the entire structure of the housing 302 will be described using FIGS. 3A to 3E. FIGS. 3A to 3E illustrate a state of the housing 302 when the front and rear covers 303 and 304 are removed from the physical quantity detection device 300. FIG. 3A is a front view of the housing 302. FIG. 3B is a rear view of the housing 302. FIG. 3C is a left side view of the housing 302. FIG. 3D is a right side view of the housing 302. FIG. 3E is a IIIe-IIIe line sectional view of FIG. 3A.

The housing 302 has a structure where the measuring portion 331 extends toward the center of the main passage 124 from the flange 311. The circuit substrate 400 is insert-molded on the base end side of the measuring portion 331. The circuit substrate 400 is disposed in parallel along the surface of the measuring portion 331 at an intermediate position of the front surface and the rear surface of the measuring portion 331, and integrally molded with the housing 302. The base end side of the measuring portion 331 is sectioned into one side and the other side in a thickness direction.

A circuit chamber Rc accommodating the circuit portion of the circuit substrate 400 is formed on the front surface side of the measuring portion 331. A sensor chamber Rs accommodating a pressure sensor 421 and a humidity sensor 422 is formed on the rear surface side. The circuit chamber Rc is sealed by attaching the front cover 303 to the housing 302, to be completely separated from the exterior. Meanwhile, the secondary bypass passage 306 and the sensor chamber Rs as a chamber space communicating with the exterior of the measuring portion 331 via the secondary bypass passage 306 are formed by attaching the rear cover 304 to the housing 302. A part of the circuit substrate 400 protrudes into the first bypass passage 305 through a separating wall 335 separating the circuit chamber Rc of the measuring portion 331 and the first bypass passage 305 from each other, and a flow rate detection portion 602 is provided on a measurement flow passage surface 430 of the protruding portion.

3.2 Structure of Bypass Passage Trench

A bypass passage trench for forming the first bypass passage 305 is provided on the length direction leading end side of the measuring portion 331. The bypass passage trench for forming the first bypass passage 305 includes a front side bypass passage trench 332 illustrated in FIG. 3A and a rear side bypass passage trench 334 illustrated in FIG. 3B. The front side bypass passage trench 332 is gradually curved to the flange 311 side as the base end side of the measuring portion 331 as traveling toward an upstream side outer wall 336 from a first bypass passage outlet port 305b opened in a downstream side outer wall 338 of the measuring portion 331 as illustrated in FIG. 3A, and communicates with an opening 333 penetrating the measuring portion 331 in its thickness direction at a position near the upstream side outer wall 336. The opening 333 is formed along the flow direction of the measurement target gas 30 of the main passage 124 so as to extend between the upstream side outer wall 336 and the downstream side outer wall 338.

The rear side bypass passage trench 334 travels toward the downstream side outer wall 338 from the upstream side outer wall 336, as illustrated in FIG. 3B, and is divided into two branches at the intermediate position of the upstream side outer wall 336 and the downstream side outer wall 338. One thereof extends in a straight line as it is as a discharge passage, and is opened in a discharge port 305c of the downstream side outer wall 338. The other is gradually curved to the flange 311 side as the base end side of the measuring portion 331 as traveling to the downstream side outer wall 338, and communicates with the opening 333 at a position near the downstream side outer wall 338.

The rear side bypass passage trench 334 forms an inlet trench into which the measurement target gas 30 flows from the main passage 124, and the front side bypass passage trench 332 forms an outlet port trench for returning the measurement target gas 30 input from the rear side bypass passage trench 334 to the main passage 124. Since the front side bypass passage trench 332 and the rear side bypass passage trench 334 are provided in the leading end of the housing 302, the gas distant from the inner wall surface of the main passage 124, that is, the gas flow through the vicinity of the center of the main passage 124 can be input as the measurement target gas 30. The gas flowing through the vicinity of the inner wall surface of the main passage 124 is influenced by the temperature of the wall surface of the main passage 124 and has a temperature different from the average temperature of the gas flowing through the main passage 124 such as the measurement target gas 30 in many cases. The gas flowing through the vicinity of the inner wall surface of the main passage 124 has a flow velocity lower than the average flow velocity of the gas flowing through the main passage 124 in many cases. Since the physical quantity detection device 300 according to the embodiment is resistant to such influence, it is possible to suppress the decrease of the measurement accuracy.

As illustrated in FIG. 3B, a part of the measurement target gas 30 flowing through the main passage 124 is input from the first bypass passage inlet port 305a into the rear side bypass passage trench 334, and flows through the rear side bypass passage trench 334. A foreign object having a heavy mass contained in the measurement target gas 30 flows into the discharge passage extending in a straight line as it is from the branching point together with a part of the measurement target gas 30, and is discharged into the main passage 124 from the discharge port 305c of the downstream side outer wall 338.

The rear side bypass passage trench 334 gradually deepens as the gas flows, and the measurement target gas 30 slowly moves to the front side of the measuring portion 331 as it flows along the rear side bypass passage trench 334. In particular, the rear side bypass passage trench 334 includes a steep slope portion 334a which steeply deepens near the opening 333, so that apart of the air having alight mass moves along the steep slope portion 334a and then flows on the side of the measurement flow passage surface 430 of the circuit substrate 400 in the opening 333. Meanwhile, since a foreign object having a heavy mass has difficulty in steeply changing its path, it flows on the side of the rear surface of measurement flow passage surface 431.

As illustrated in FIG. 3A, the measurement target gas 30 moving to the front side in the opening 333 flows along the measurement flow passage surface 430 of the circuit substrate, and heat transfer is performed with the flow rate detection portion 602 provided on the measurement flow passage surface 430, in order to measure a flow rate. The air flowing into the front side bypass passage trench 332 from the opening 333 flows along the front side bypass passage trench 332, and is discharged into the main passage 124 from the first bypass passage outlet port 305b opened in the downstream side outer wall 338.

A substance having a heavy mass such as a contaminant mixed in the measurement target gas 30 has a high inertial force, and has difficulty in steeply changing its path to the deep side of the trench along the surface of the steep slope portion 334a where a depth of the trench steeply deepens. For this reason, since a foreign object having a heavy mass moves through the side of the rear surface of measurement flow passage surface 431, it is possible to suppress the foreign object from passing through the vicinity of the flow rate detection portion 602. In this embodiment, since most of foreign objects having a heavy mass other than the gas pass through the rear surface of measurement flow passage surface 431 which is a rear surface of the measurement flow passage surface 430, it is possible to reduce the influence of contamination caused by a foreign object such as an oil component, carbon, or a contaminant and suppress the degradation of the measurement accuracy. That is, since the path of the measurement target gas 30 steeply changes along an axis across the flow axis of the main passage 124, it is possible to reduce the influence of a foreign object mixed in the measurement target gas 30.

3.3 Structures and Effects of Secondary Bypass Passage and Sensor Chamber

The secondary bypass passage 306 is formed in a straight line between the secondary bypass passage inlet port 306a and the secondary passage outlet port 306b in parallel to the flange 311 in the flow direction of the measurement target gas 30. The secondary bypass passage inlet port 306a is formed by cutting out a part of the upstream side outer wall 336, and the secondary passage outlet port 306b is formed by cutting out apart of the downstream side outer wall 338. Specifically, as illustrated in FIG. 3B, the secondary bypass passage inlet port 306a is formed by cutting out a part of the upstream side outer wall 336 and a part of the downstream side outer wall 338 from the rear surface side of the measuring portion 331 at a position continuously taken along the upper surface of the separating wall 335. The secondary bypass passage inlet port 306a and the secondary passage outlet port 306b are cut out to a depth position at which the secondary bypass passage inlet port 306a and the secondary passage outlet port 306b are flush with the rear surface of the circuit substrate 400 (FIG. 3C). Since the measurement target gas 30 passes along the rear surface of a substrate body 401 of the circuit substrate 400, the secondary bypass passage 306 functions as a cooling channel for cooling the substrate body 401. Many circuit substrates 400 have an element having heat such as LSI or a microcomputer, and transmits the heat to the rear surface of the substrate body 401, from which the heat can be released by the measurement target gas 30 passing through the secondary bypass passage 306.

The sensor chamber Rs is provided on the base end side of the measuring portion 331 with respect to the secondary bypass passage 306. A part of the measurement target gas 30 flowing into the secondary bypass passage 306 from the secondary bypass passage inlet port 306a flows into the sensor chamber Rs. Pressure and relative humidity are respectively detected by the pressure sensor 421 and the humidity sensor 422 in the sensor chamber Rs. Since the sensor chamber Rs is disposed on the base end side of the measuring portion 331 with respect to the secondary bypass passage 306, the influence of the dynamic pressure of the measurement target gas 30 passing through the secondary bypass passage 306 can be reduced. Therefore, the detection accuracy of the pressure sensor 421 in the sensor chamber Rs can be improved.

The sensor chamber Rs is disposed on the base end side of the measuring portion 331 with respect to the secondary bypass passage 306. Therefore, for example, when the measuring portion 331 is attached to the intake passage in a posture state where the leading end side of the measuring portion 331 is directed downward, pollution products and water droplets flowing into the secondary bypass passage 306 together with the measurement target gas 30 can be prevented from adhering to the pressure sensor 421 or the humidity sensor 422 disposed on the downstream side thereof.

In particular, in this embodiment, the pressure sensor 421 having a comparatively large outer shape is disposed on the upstream side in the sensor chamber Rs, and the humidity sensor 422 having a comparatively small outer shape is disposed on the downstream side of the pressure sensor 421. Therefore, the pollution products and the water droplets flowing into the sensor chamber Rs together with the measurement target gas 30 adhere to the pressure sensor 421, and are prevented from adhering to the humidity sensor 422. Therefore, the humidity sensor 422 having low resistance properties against the pollution products and the water droplets can be protected.

The pressure sensor 421 and the humidity sensor 422 are less likely to be influenced by the flow of the measurement target gas as compared with the flow rate detection portion 602. In particular, it is enough that the humidity sensor 422 can secure at least the diffusion level of moisture in the measurement target gas 30. Therefore, the pressure sensor 421 and the humidity sensor 422 can be provided in the sensor chamber Rs adjoining the straight line secondary bypass passage 306. Meanwhile, the flow rate detection portion 602 requires a flow velocity of equal to or greater than a certain value, and needs to keep away dusts and pollution products and consider the influence on pulsation. Therefore, the flow rate detection portion 602 is provided in the first bypass passage 305 having a shape circling around in a loop manner.

Figure 4A:
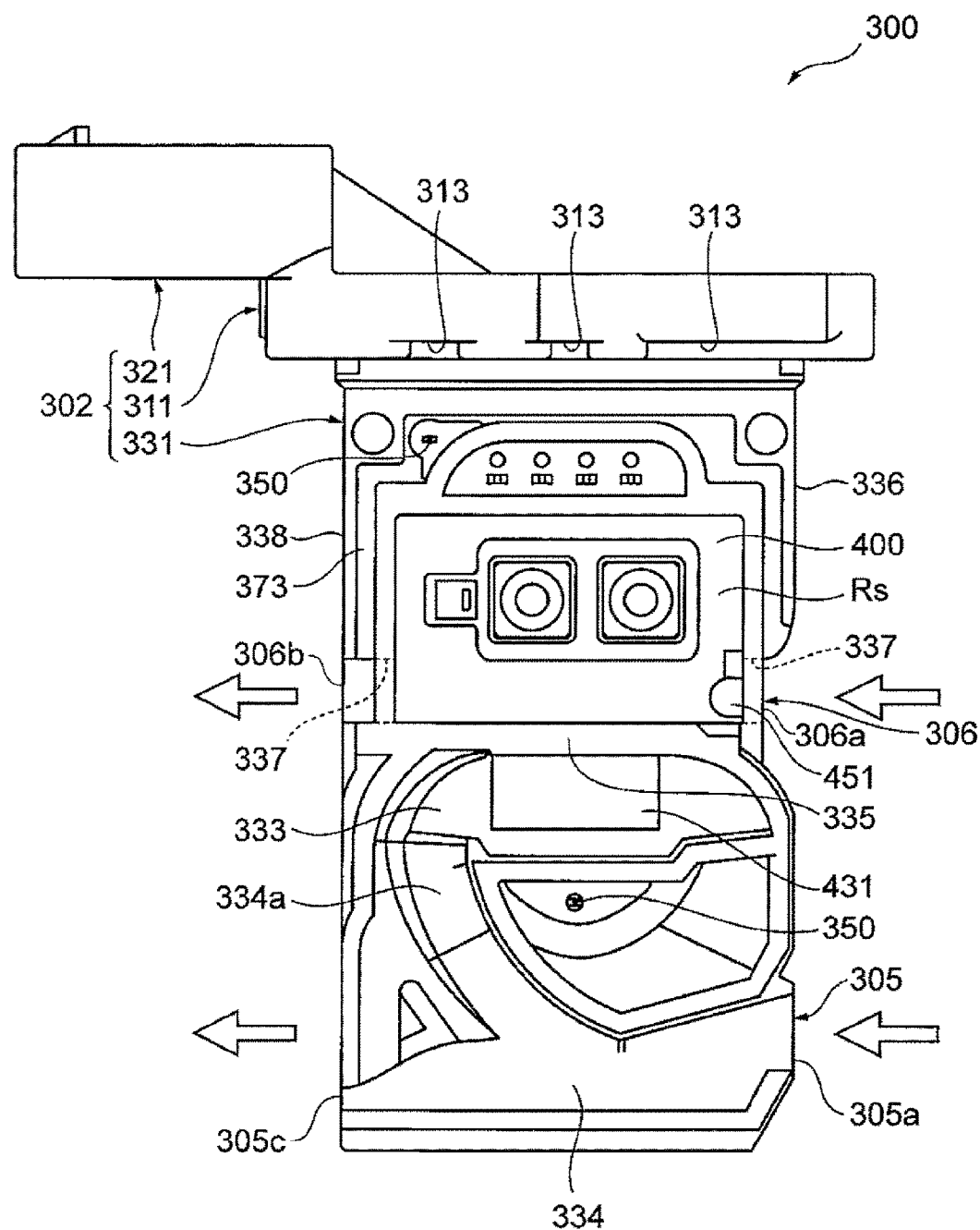
FIG. 4A is a rear view illustrating another embodiment of a housing.
Figure 4B:
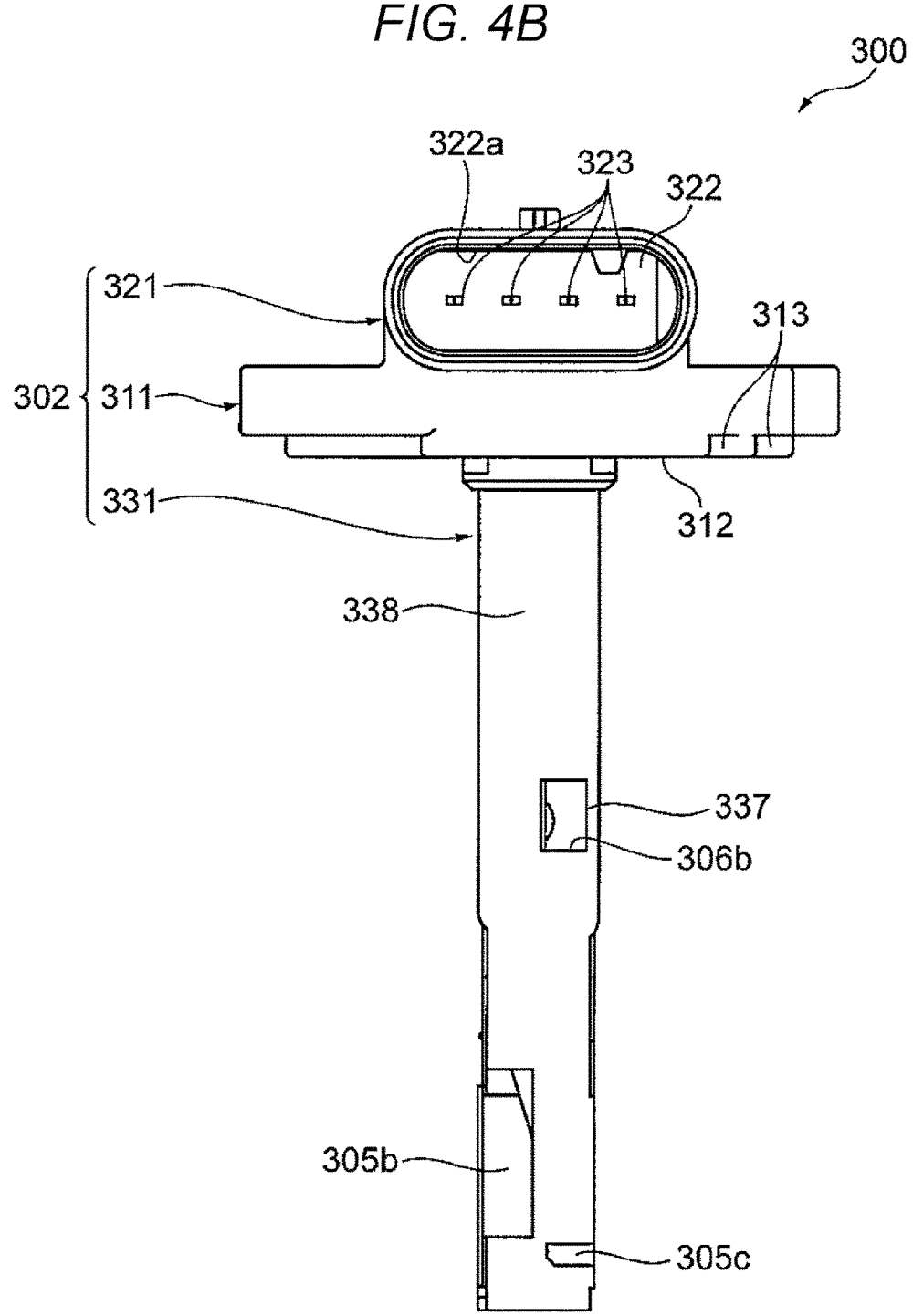
FIG. 4B is a right side view of the housing illustrated in FIG. 4A.

FIGS. 4A and 4B illustrate another form of the secondary bypass passage.

In this form, a secondary bypass passage inlet port 306*a* and a secondary passage outlet port 306*b* are formed by providing a through hole 337 in an upstream side outer wall 336 and a downstream side outer wall 338 instead of cutting out the upstream side outer wall 336 and the downstream side outer wall 338. When the secondary bypass passage inlet port 306*a* and the secondary passage outlet port 306*b* are formed by cutting out the upstream side outer wall 336 and the downstream side outer wall 338 as in the secondary bypass passage illustrated in FIGS. 3B to 3E, the width of the upstream side outer wall 336 and the width of the downstream side outer wall 338 are locally narrow at the position. Therefore, the measuring portion 331 may be distorted in an almost V shape with cutout as a starting point by heat shrinkage or the like during mold forming. Since the through hole is provided instead of the cutout in this form, the measuring portion 331 can be prevented from being bent in an almost V shape. Therefore, changes in the position and the direction of the detecting portion with respect to the measurement target gas 30 by the strain of the housing 302 can be prevented from influencing detection accuracy, so that constant detection accuracy can be always secured without causing no individual difference.

Figure 8A:
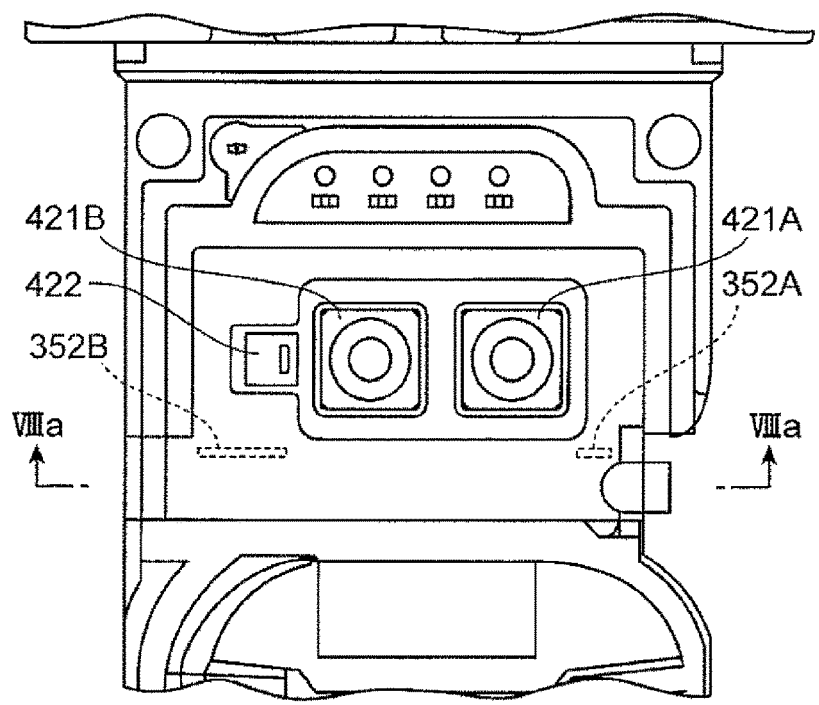
FIG. 8A illustrates another embodiment of a sensor chamber; (a) is an enlarged view of the sensor chamber; and (b) is a VIIIa-VIIIa line sectional view of (a).
Figure 8A:
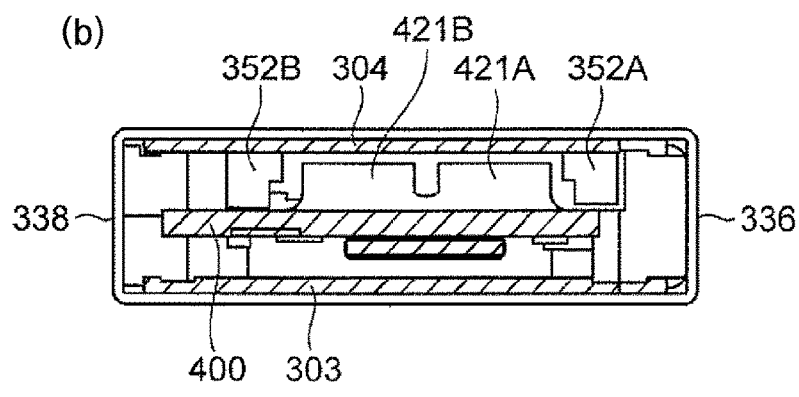
Figure 8B:
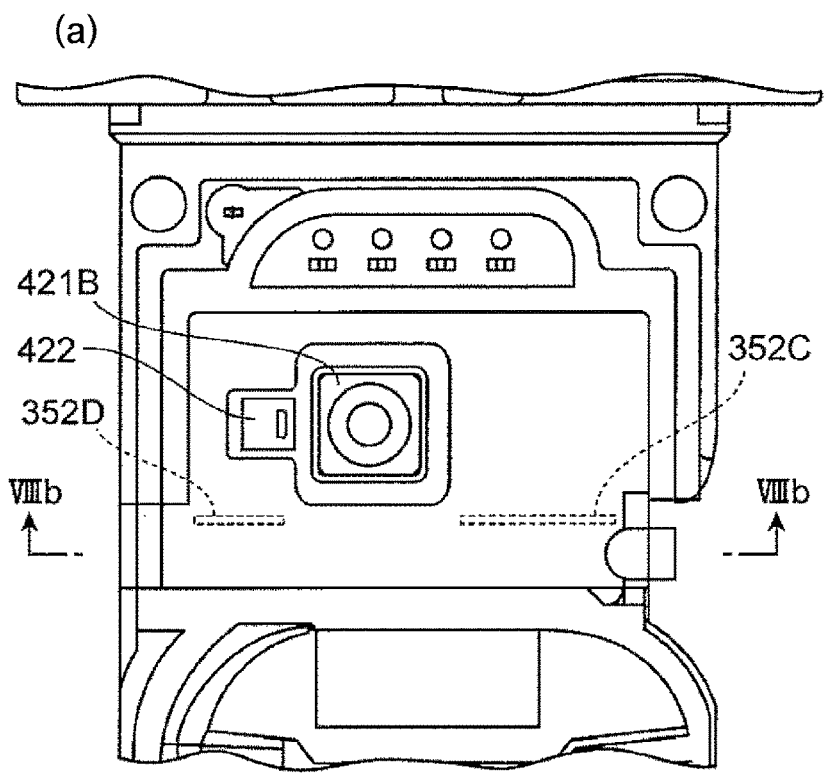
FIG. 8B illustrates another embodiment of a sensor chamber; (a) is an enlarged view of the sensor chamber; and (b) is a VIIIb-VIIIb line sectional view of (a).
Figure 8B:
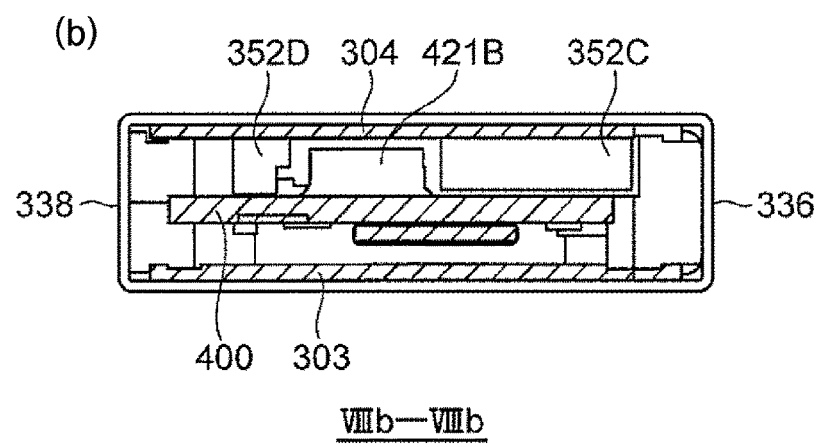
Figure 8C:
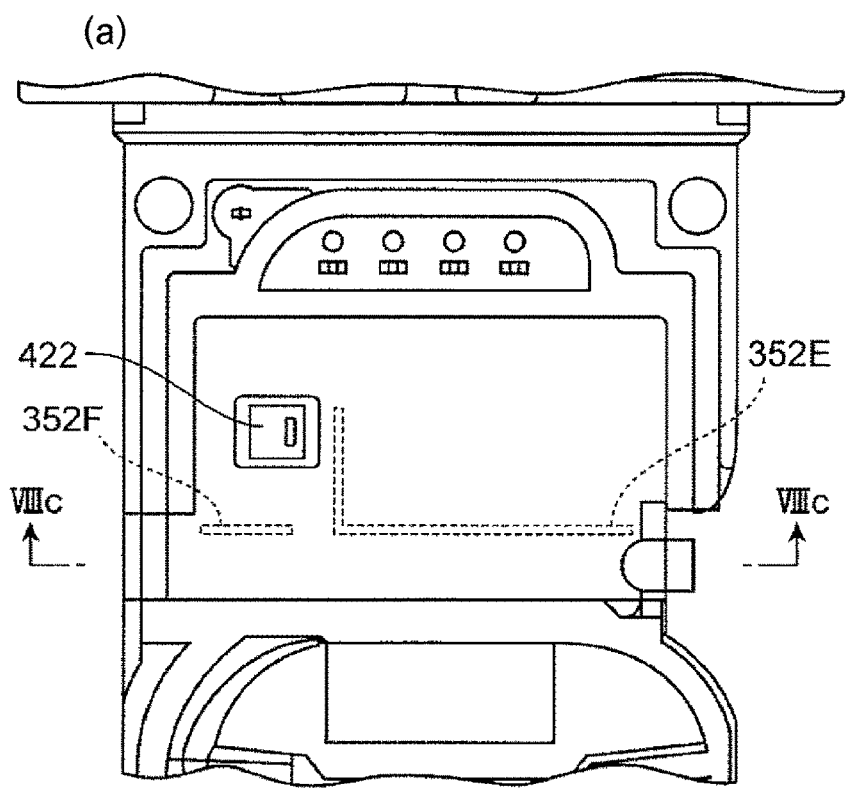
FIG. 8C illustrates another embodiment of a sensor chamber; (a) is an enlarged view of the sensor chamber; and (b) is a VIIIc-VIIIc line sectional view of (a).
Figure 8C:
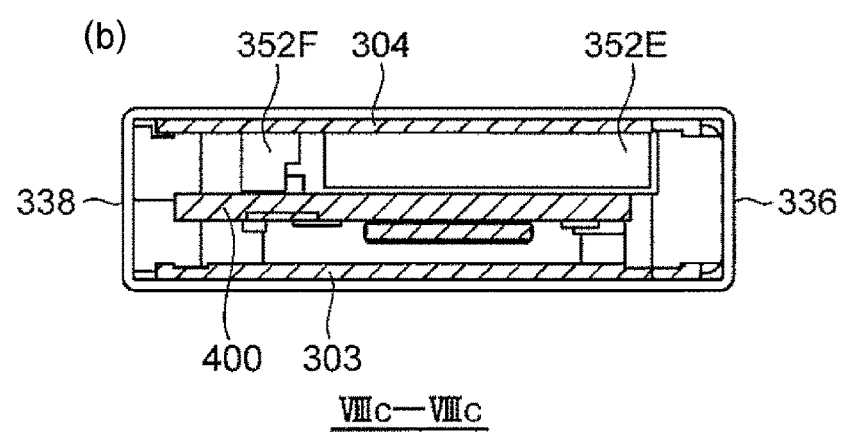

FIGS. 8A, 8B, and 8C illustrate another embodiment of the secondary bypass passage.

As another embodiment, a separating wall separating a secondary bypass passage 306 and a sensor chamber Rs from each other may be provided on a rear cover 304. According to the configuration, the measurement target gas 30 can be made to indirectly flow into the sensor chamber Rs from the secondary bypass passage 306, so that the influence of dynamic pressure on a pressure sensor can be reduced and the adhesion of pollution products or water droplets to a humidity sensor can be suppressed.

FIG. 8A illustrates the structure of a sensor chamber. In FIG. 8A, (a) is an enlarged view of the sensor chamber, and (b) is a VIIIa-VIIIa line sectional view of (a). In an example illustrated in FIG. 8A, in the sensor chamber Rs, two pressure sensors 421A and 421B are provided on a line along a secondary bypass passage 306, and one humidity sensor 422 is provided on the downstream side of the pressure sensors 421A and 421B. Separating walls 352A and 352B are provided on the rear cover 304. By attaching the rear cover 304 to a housing 302, the separating walls 352A and 352B are disposed so as to extend between the secondary bypass passage 306 and the sensor chamber Rs. Specifically, the separating wall 352A is disposed between the upstream side pressure sensor and the upstream wall of the sensor chamber Rs, and the separating wall 352B is disposed along the humidity sensor between the downstream pressure sensor and the downstream wall of the sensor chamber Rs.

FIG. 8B illustrates the structure of a sensor chamber according to another embodiment. In FIG. 8B, (a) is an enlarged view of the sensor chamber, and (b) is a VIIIb-VIIIb line sectional view of (a). An example illustrated in FIG. 8B has a specification in which only a downstream side pressure sensor 421B is present and an upstream pressure sensor 421A is omitted. A separating wall 352C is lengthened by the specification. A downstream side separating wall 352D is disposed along a humidity sensor between a downstream side pressure sensor and a downstream wall of a sensor chamber Rs as in the separating wall 352B of FIG. 8A. Therefore, the separating walls 352A and 352C can prevent a measurement target gas 30 from directly hitting against the pressure sensor, so that the influence of dynamic pressure can be reduced. The separating walls 352B and 352D can suppress the adhesion of pollution products and water droplets to a humidity sensor.

FIG. 8C illustrates the structure of a sensor chamber according to still another embodiment. In FIG. 8C, (a) is an enlarged view of the sensor chamber, and (b) is a VIIIc-VIIIc line sectional view of (a). An example illustrated in FIG. 8C has a specification in which both two pressure sensors 421A and 421B are omitted, and only one humidity sensor 422 is provided in a sensor chamber Rs. An upstream side separating wall 352E extends from the upstream wall of the sensor chamber Rs to the upstream position of the humidity sensor between a secondary bypass passage 306 and the sensor chamber Rs, and has an almost L shape. The upstream side separating wall 352E is bent at a downstream end to be opposed to the upstream side of the humidity sensor. A separating wall 352F is disposed along the humidity sensor between a downstream side pressure sensor and the downstream wall of the sensor chamber Rs as in separating walls 352B and 352D. Therefore, the separating wall 352E can prevent pollution products and water droplets contained in a measurement target gas 30 passing through the secondary bypass passage 306 from moving toward the humidity sensor, so that the humidity sensor can be protected from the pollution products or the like.

3.4 Shapes and Effects of Front Cover 303 and Rear Cover 304

Figure 5A:
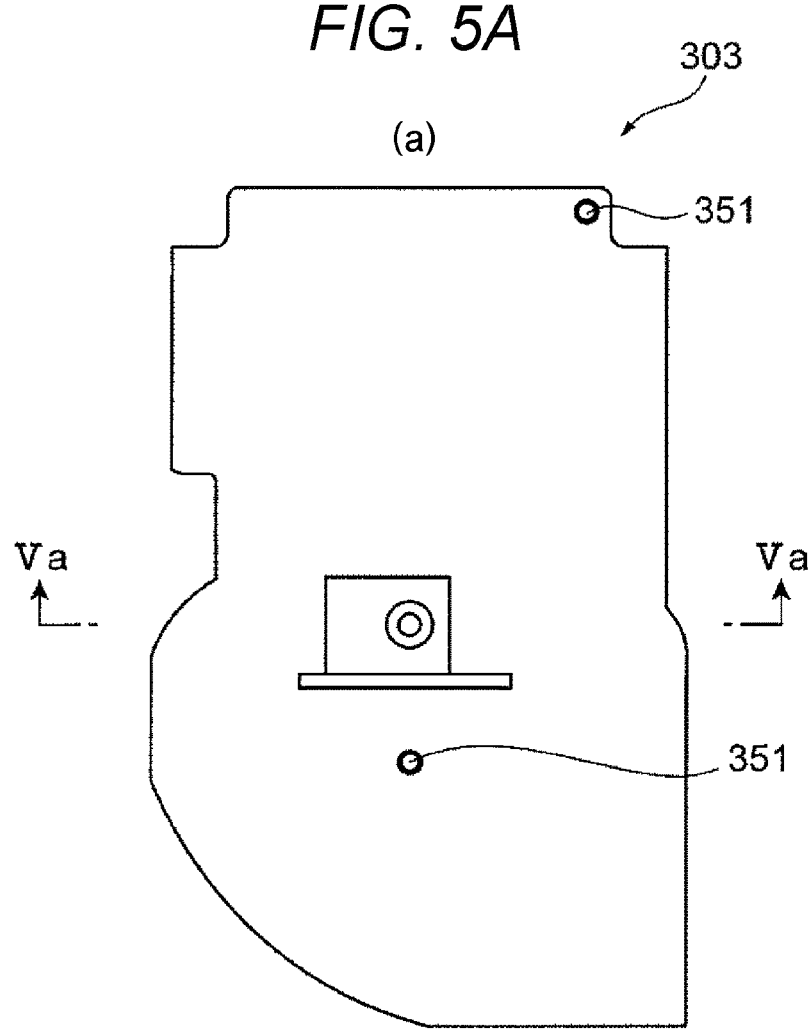
FIG. 5A is a front view (a) of the front cover and a Va-Va line sectional view (b) thereof.
Figure 5B:
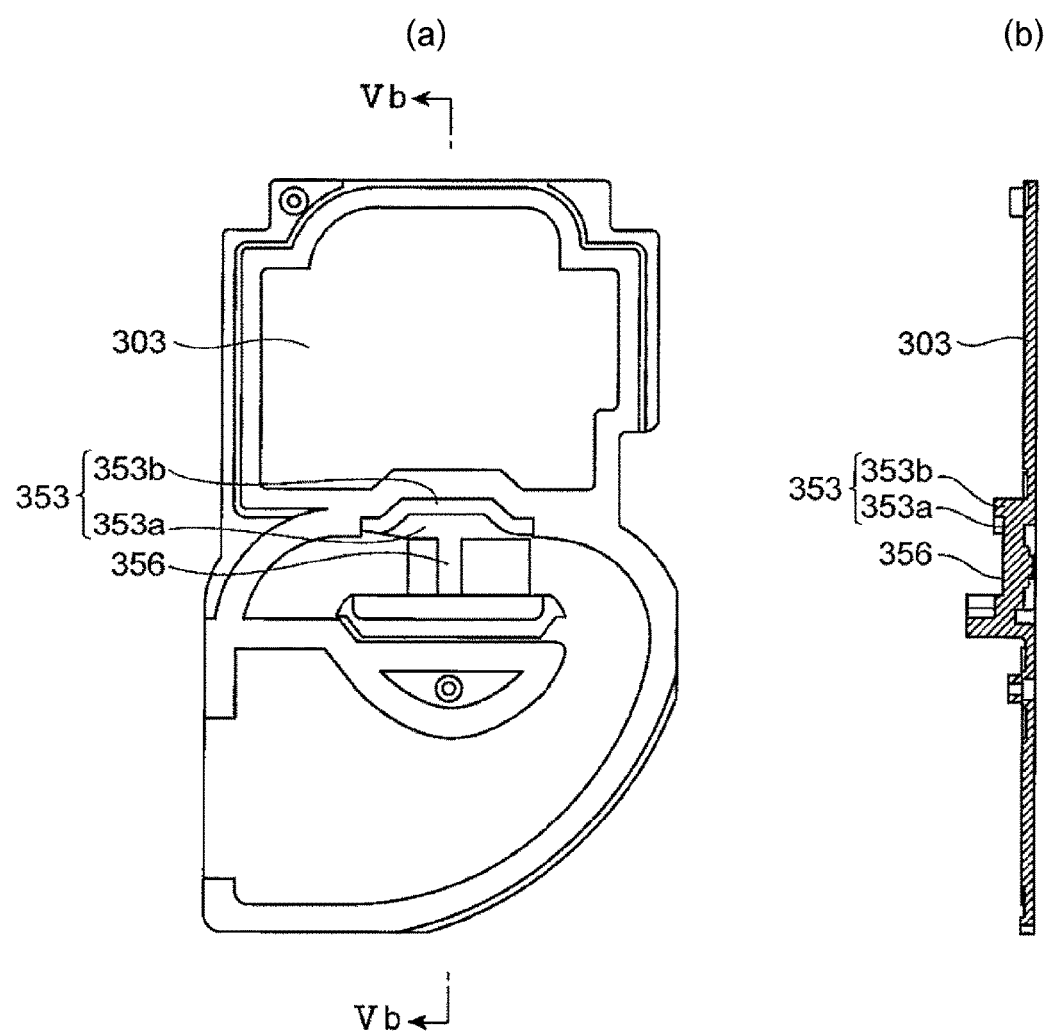
FIG. 5B is a rear view (a) of the front cover and a Vb-Vb line sectional view (b) thereof.
Figure 6:
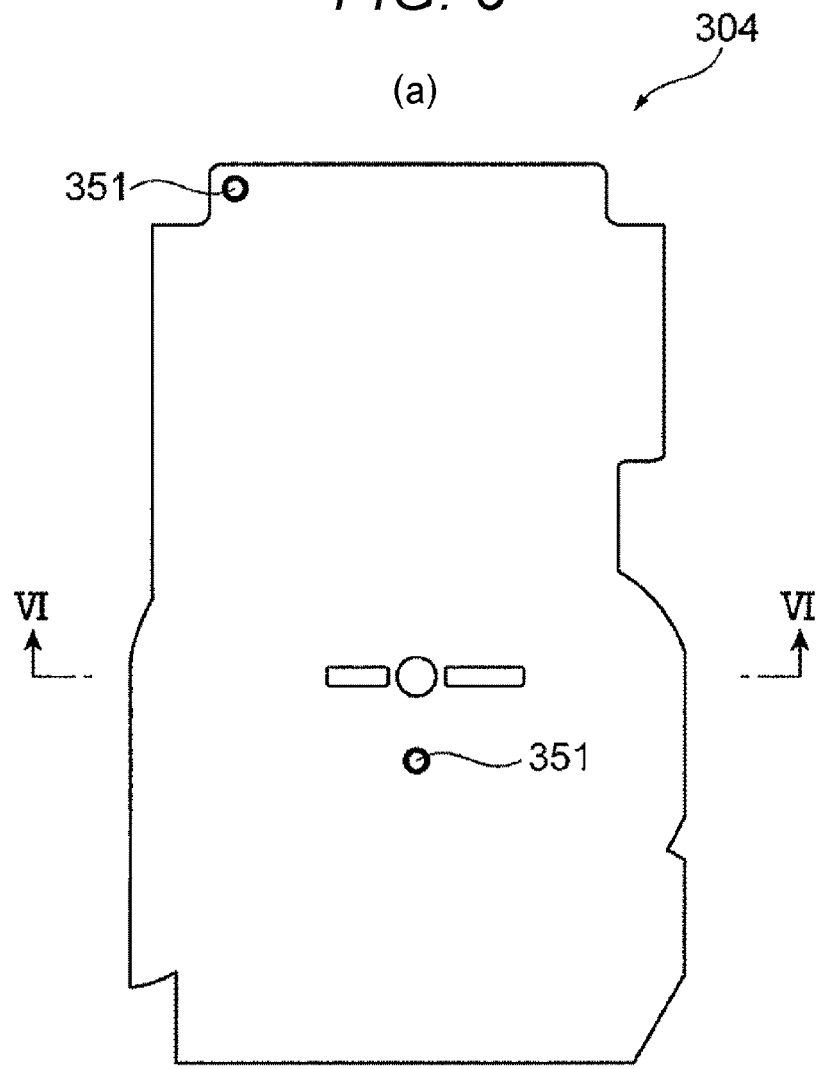
FIG. 6 is a front view (a) of the rear cover and a VI-VI line sectional view (b) thereof.
Figure 6:

FIG. 5A illustrates the exterior of the front cover 303. FIG. 5A(a) is a front view. FIG. 5A(b) is a Va-Va line sectional view of FIG. 5A(a). FIG. 5B(a) is a rear view. FIG. 5B(b) is a Vb-Vb line sectional view of FIG. 5B(a). FIG. 6 illustrates the exterior of the rear cover 304. FIG. 6 (*a*) is a front view. FIG. 6(*b*) is a VI-VI line sectional view of FIG. 6(*a*).

Figure 5A:
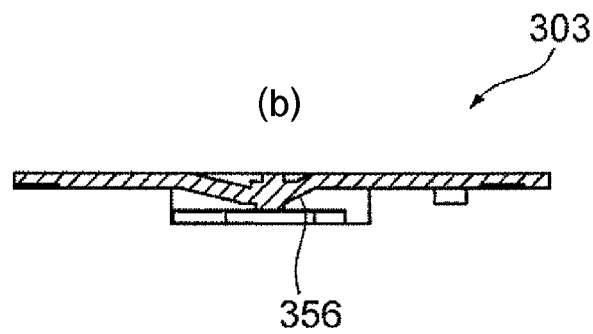

As illustrated in FIGS. 5 and 6, the front cover 303 and the rear cover 304 close the front side bypass passage trench 332 and the rear side bypass passage trench 334 of the housing 302 to form the first bypass passage 305. The front cover 303 forms the sealed circuit chamber Rc, and the rear cover 304 closes the rear side recessed portion of the measuring portion 331 to form the secondary bypass passage 306 and the sensor chamber Rs communicating with the secondary bypass passage 306.

The front cover 303 includes an orifice portion 356 for reducing the flow passage area of the first bypass passage 305 at a position opposed to the flow rate detection portion 602, and is used for forming an orifice between the front cover 303 and the measurement flow passage surface 430. For this reason, it is desirable that the formation accuracy is high. Since the front or rear cover 303 or 304 is formed through a resin molding process by injecting a thermoplastic resin to a die, it is possible to provide high formation accuracy.

A plurality of fixing holes 351 into which a plurality of fixing pins 350 protruding from the measuring portion 331 are inserted are provided in the front cover 303 and the rear cover 304. The front cover 303 and the rear cover 304 are respectively attached to the surface and the rear surface of the measuring portion 331. At that time, the fixing pins 350 are inserted into the fixing holes 351 for positioning. The front cover 303 and the rear cover 304 are joined by laser welding or the like along the edges of the front side bypass passage trench 332 and the rear side bypass passage trench 334. Similarly, the front cover 303 and the rear cover 304 are joined by laser welding or the like along the edges of the circuit chamber Rc and the sensor chamber Rs.

FIG. 5C is an enlarged view of a dotted line portion Vc surrounding the circumference of the flow rate detection portion 602 of FIG. 3A, and FIG. 5C(a) to 5C(d) illustrates some embodiments.

The front cover 303 includes a protrusion 353 protruding into the first bypass passage 305 to cover at least a part of a synthetic resin material 418. As illustrated in FIGS. 2G, 2H, and 3A, a part of the flow rate detection portion 602 and a wiring connected portion thereof are sealed with a synthetic resin material 418. The synthetic resin material 418 is applied to a connected portion of the flow rate detection portion 602 including a metal wire 404 and the circuit substrate 400, and cured to seal the connected portion. The synthetic resin material 418 has a shape having a step protruding from the circuit substrate 400 after curing. The synthetic resin material 418 is exposed to the opening 333 in the first bypass passage 305.

By exposing the synthetic resin material 418 to the opening 333 in the bypass passage, a predetermined space occurs between the synthetic resin material 418 and the separating wall 335 and between the synthetic resin material 418 and the front cover 303. Therefore, the protrusion 353 is provided on the side of the front cover 303. The protrusion 353 is disposed at a position taken along the synthetic resin material 418 and the protruding step of the circuit substrate 400 and opposed to the synthetic resin material 418, and in a space between the synthetic resin material 418 and the separating wall 335.

Generally, the viscoelasticity of the synthetic resin material 418 is degraded when a curing process transitions to high temperatures from normal temperatures, so that variations in the height and the shape of the synthetic resin material 418 after curing are caused according to an environment change during manufacturing. The variations in the height and the shape of the synthetic resin material 418 influence the flow around the flow rate detection portion 602 to degrade measurement stability. Therefore, the protrusion 353 is provided on the cover side, which covers at least apart of the synthetic resin material 418 to prevent the measurement target gas 30 from passing through the circumference of the synthetic resin material 418, particularly a portion between the synthetic resin material 418 and the separating wall 335, i.e., the upper surface of the synthetic resin material 418, thereby allowing the influence to be reduced.

In FIG. 5C, the outer shape positions of the protrusion 353 and the orifice portion 356 on the side of the front cover 303 are shown by virtual lines. In the form illustrated in FIGS. 5C(a) and 5C(b), the separating wall 335 of the housing 302 included in the bypass passage trench is partially recessed on the side of the circuit chamber Rc. Thus, the separating wall 335 is recessed on the side of the circuit chamber Rc, so that the flow rate detection portion 602 can be disposed near the separating wall 335, and the full length of the first bypass passage 305, eventually, the housing 302 can be designed to be short. The form of FIG. 5C (a) has an effective shape when the mounting area of the circuit substrate 400 is secured. In addition, a convex shape providing the equivalent effect is not limited to the form illustrated in FIGS. 5C(a) and 5C(b).

The protrusion 353 of the front cover 303 protrudes into the first bypass passage 305, and is disposed along the separating wall 335 so as to form the outer peripheral part of the opening 333. The protrusion 353 is disposed so that at least ⅓ or more of the synthetic resin material 418 is covered with the protrusion 353 in an axial direction toward the loop center portion of the first bypass passage 305 as the side of the flow rate detection portion 602 from the separating wall 335.

The protrusion 353 includes a first opposed portion 353a opposed to the synthetic resin material 418, and a second opposed portion 353b opposed to the substrate 400 between the synthetic resin material 418 and the separating wall 335. As illustrated in FIG. 2H, the first opposed portion 353a forms the same plane without forming a step between the first opposed portion 353a and the minimal portion of the orifice portion 356 closest to the flow rate detection portion 602, so that the fluid noise of the measurement target gas 30 passing through the flow rate detection portion 602 can also be reduced.

The first opposed portion 353a prevents the measurement target gas 30 from passing through between the first opposed portion 353a and the synthetic resin materials 418. The second opposed portion 353b prevents the measurement target gas 30 from passing through between the synthetic resin material 418 and the separating wall 335. Therefore, the measurement target gas 30 can pass through the opening 333 of the first bypass passage 305 without being influenced by the height and the shape of the synthetic resin material 418, so that the flow rate detection portion 602 can obtain high measurement stability.

The second opposed portion 353b extends from between the synthetic resin material 418 and the separating wall 335 to an upstream side position and a downstream side position in the flow direction of the measurement target gas 30 with respect to the synthetic resin material 418. A step is formed between the synthetic resin material 418 and the circuit substrate 400. When the measurement target gas 30 passes through the step of the synthetic resin material 418 on the upstream side, burble occurs. Particularly, variations in the shape of the synthetic resin material 418 are caused in a manufacturing process, so that the measurement stability of the flow rate detection portion 602 may be degraded. However, by lengthening the second opposed portion 353b to the upstream side position and downstream side position of the synthetic resin material 418, the influence of the step can be reduced.

Since the front cover 303 is formed by the resin molding process, the protrusion 353 can be formed with high formation accuracy. The case where the second opposed portion 353b is lengthened to both the upstream side and the downstream side of the synthetic resin material 418 has been described, but the second opposed portion 353b may be lengthened only to the upstream side.

In the form illustrated in FIGS. 5C(c) and 5C(d), the separating wall 335 has a shape extending in a straight line along the flow direction of the measurement target gas 30. At that time, the protrusion 353 of the front cover 303 is disposed along the step between the synthetic resin material 418 and the circuit substrate 400. Furthermore, the protrusion 353 of the front cover 303 is disposed on the upstream side or the upstream and downstream sides so as to cover at least ⅓ or more of the synthetic resin 418 in the axial direction toward the loop center portion of the first bypass passage 305 from the separating wall 335.

In the form illustrated in FIG. 5C(d), the protrusion 353 includes a sloped surface 354 sloped in a direction in which the sloped surface 354 gradually approaches the flow rate detection portion 602 as traveling to the downstream side in the flow direction on the upstream side in the flow direction of the measurement target gas 30 with respect to the flow rate detection portion 602. The sloped surface 354 is provided in the second opposed portion 353b. The sloped surface 354 adjusts the flow of the measurement target gas 30 flowing through the opening 333 of the first bypass passage 305, so that the measurement stability of the flow rate detection portion 602 can be improved.

3.5 Structure for Fixing Circuit Substrate 400 Using Housing 302 and Effects Thereof Next, the fixation of the circuit substrate 400 to the housing 302 through a resin molding process will be described. The circuit substrate 400 is integrally molded with the housing 302 such that the flow rate detection portion 602 of the circuit substrate 400 is disposed at a predetermined position of the bypass passage trench for forming the bypass passage, for example, the opening 333 as a link portion between the front side bypass passage trench 332 and the rear side bypass passage trench 334 in the embodiment.

A portion for burying and fixing the outer periphery part of a base portion 402 of the circuit substrate 400 into the housing 302 through resin molding is provided as fixing portions 372 and 373 in the measuring portion 331 of the housing 302. The outer periphery part of the base portion 402 of the circuit substrate 400 is fixed in a state where the outer periphery part of the base portion 402 of the circuit substrate 400 is sandwiched between the fixing portions 372 and 373 from the front side and the rear side.

The housing 302 is manufactured through a resin molding process. Through the resin molding process, the circuit substrate 400 is embedded into the resin of the housing 302 and is fixed in the housing 302 through resin molding. As a result, the flow rate detection portion 602 performs heat transfer with the measurement target gas 30, so that a positional relationship or a directional relationship or the like as a relationship with the bypass passage for measuring the flow rate, for example, the shape of the front side bypass passage trench 332 or the rear side bypass passage trench 334 can be maintained with remarkably high accuracy. In addition, it is possible to suppress an error or a variation generated in each circuit substrate 400 to a very small value.

As a result, it is possible to remarkably improve the measurement accuracy of the circuit substrate 400. For example, compared to a conventional method in which fixation is performed using an adhesive, it is possible to dramatically improve the measurement accuracy.

Since the physical quantity detection device 300 is typically manufactured in large quantities, the method of using an adhesive along with strict measurement has a limitation in improvement of measurement accuracy. However, as in this embodiment, the bypass passage is formed in the resin molding process for forming the bypass passage where the measurement target gas 30 flows while the circuit substrate 400 is fixed, so that the variation of the measurement accuracy can be remarkably reduced and the measurement accuracy of each physical quantity detection device 300 can be remarkably improved.

For example, as further described in the embodiment illustrated in FIGS. 3A to 3E, it is possible to fix the circuit substrate 400 to the housing 302 with high accuracy such that a prescribed relationship is obtained between the front side bypass passage trench 332, the rear side bypass passage trench 334, and the flow rate detection portion 602. As a result, in each of commercially produced physical quantity detection devices 300, it is possible to constantly obtain a positional relationship or a configuration relationship, or the like between the flow rate detection portion 602 of each circuit substrate 400 and the first bypass passage 305 with very high accuracy.

Since it is possible to form the first bypass passage 305 having the fixed flow rate detection portion 602 of the circuit substrate 400, such as the front side bypass passage trench 332 and the rear side bypass passage trench 334, with very high accuracy, a work of forming the first bypass passage 305 from the bypass passage trenches 332 and 334 is a work of covering both surfaces of the housing 302 with the front or rear cover 303 or 304. This work is a very simple work process having little factor of degrading the measurement accuracy. The front or rear cover 303 or 304 is produced through a resin molding process having high formation accuracy. Therefore, it is possible to finish the bypass passage provided in a prescribed relationship with the flow rate detection portion 602 of the circuit substrate 400 with high accuracy. Using this method, it is possible to obtain high productivity in addition to the improvement of the measurement accuracy.

In comparison, in the related art, the thermal flow meter was produced by fabricating the bypass passage and then bonding the measuring portion to the bypass passage using an adhesive. In such a method of using an adhesive, the thickness of the adhesive is irregular, and the position or the angle of the adhesive is different in each product. For this reason, there was a limitation in the improvement of the measurement accuracy. If this work is performed in mass production, it is very difficult to improve the measurement accuracy.

In the embodiment according to the invention, the circuit substrate 400 is fixed through resin molding while the bypass passage trench for forming the first bypass passage 305 through resin molding is formed. As a result, it is possible to form the shape of the bypass passage trench and fix the flow rate detection portion 602 to the bypass passage trench with significantly high accuracy.

A portion relating to the measurement of the flow rate, such as the flow rate detection portion 602 or the measurement flow passage surface 430 to which the flow rate detection portion 602 is attached is provided on the surface of the circuit substrate 400. The flow rate detection portion 602 and the measurement flow passage surface 430 are exposed from the resin used to form the housing 302. That is, the flow rate detection portion 602 and the measurement flow passage surface 430 are not covered by the resin used to form the housing 302. The flow rate detection portion 602 of the circuit substrate 400 or the measurement flow passage surface 430 is directly used even after the resin molding of the housing 302 to measure the flow rate of the physical quantity detection device 300. As a result, the measurement accuracy is improved.

In the embodiment according to the invention, the circuit substrate 400 is integrally molded with the housing 302 to fix the circuit substrate 400 to the housing 302 having the first bypass passage 305, so that the circuit substrate 400 can be certainly fixed to the housing 302. In particular, a protrusion 403 of the circuit substrate 400 penetrates the separating wall 335 and protrudes into the first bypass passage 305. This can provide a high sealing property between the first bypass passage 305 and the circuit chamber Rc, prevent the measurement target gas 30 from leaking from the first bypass passage 305 into the circuit chamber Rc, and prevent the corrosion of circuit components or wirings or the like of the circuit substrate 400 caused by the contact of the circuit components or the wirings with the measurement target gas 30.

3.6 Structures and Effects of Terminal Connector 320

Figure 9A:
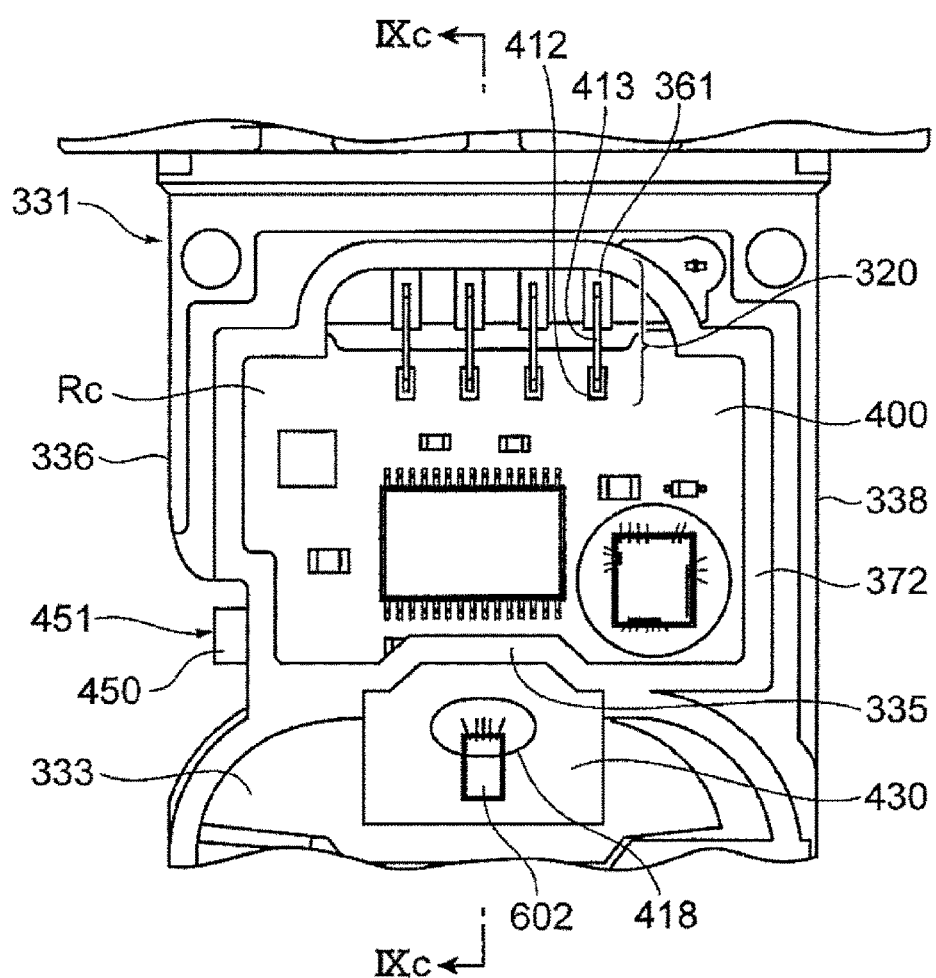
FIG. 9A illustrates the structure of a terminal connector.
Figure 9B:
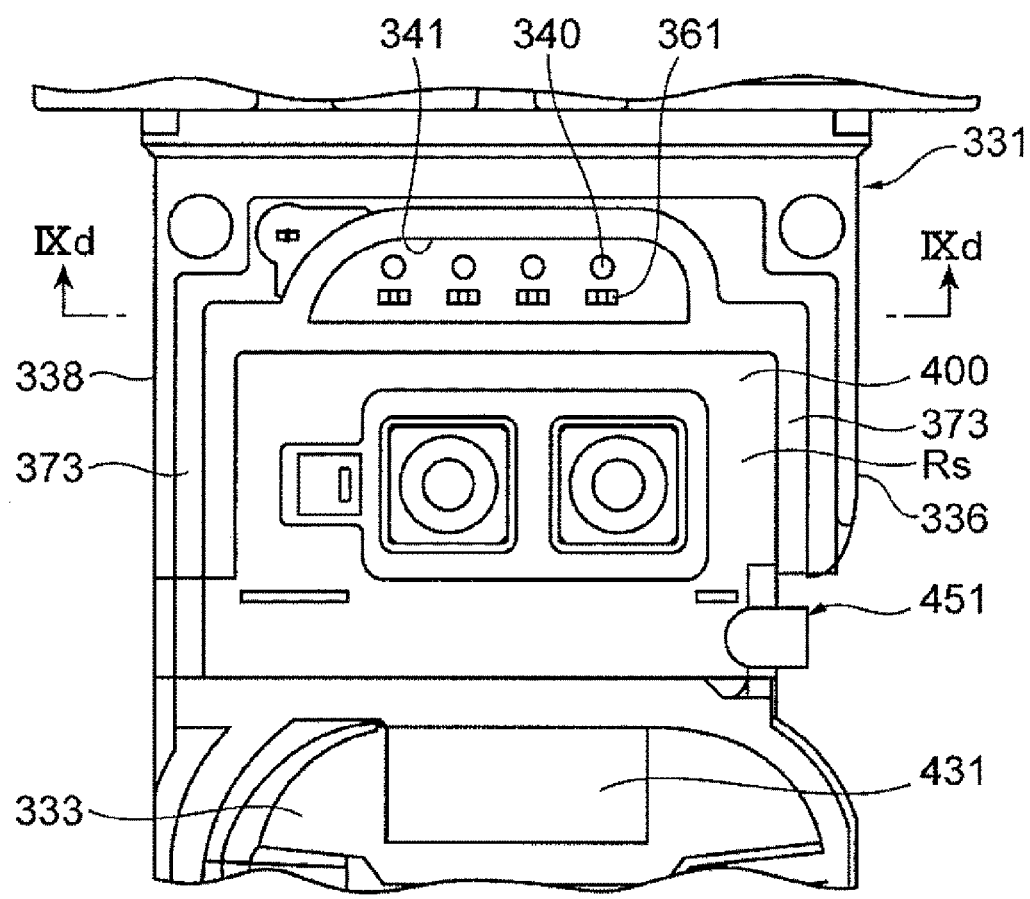
FIG. 9B illustrates the structure of a terminal connector.
Figure 9C:
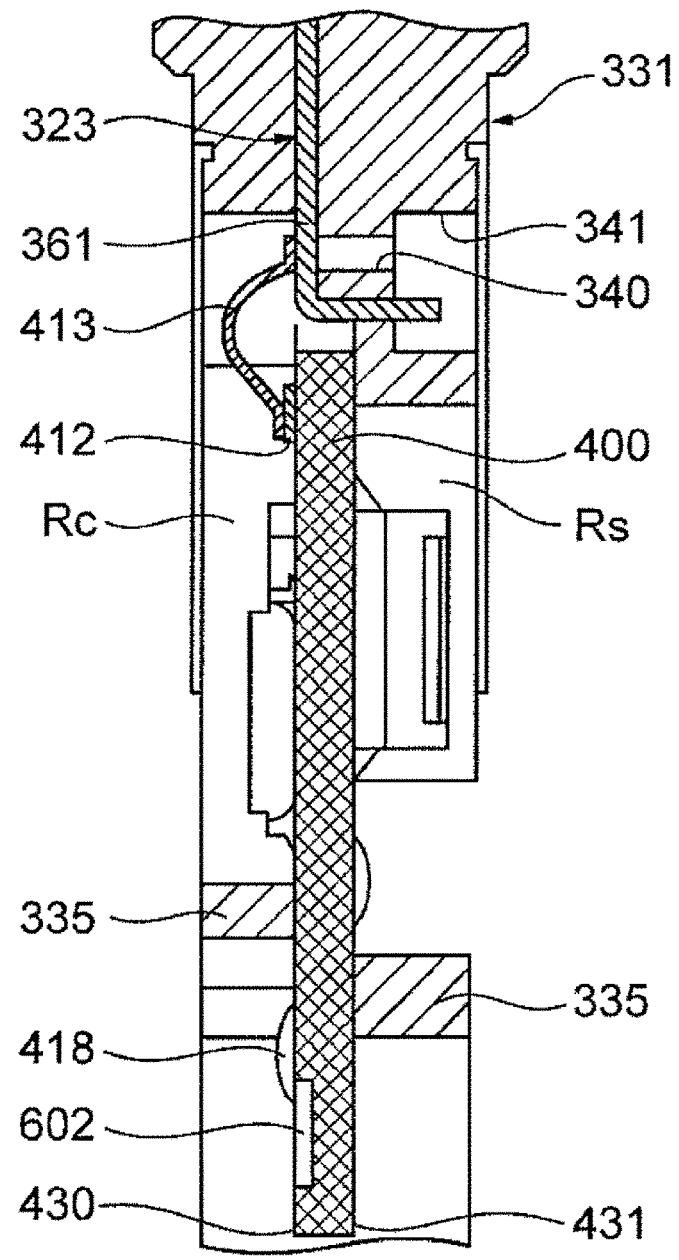
FIG. 9C is a IXc-IXc line sectional view of FIG. 9A.
Figure 9D:
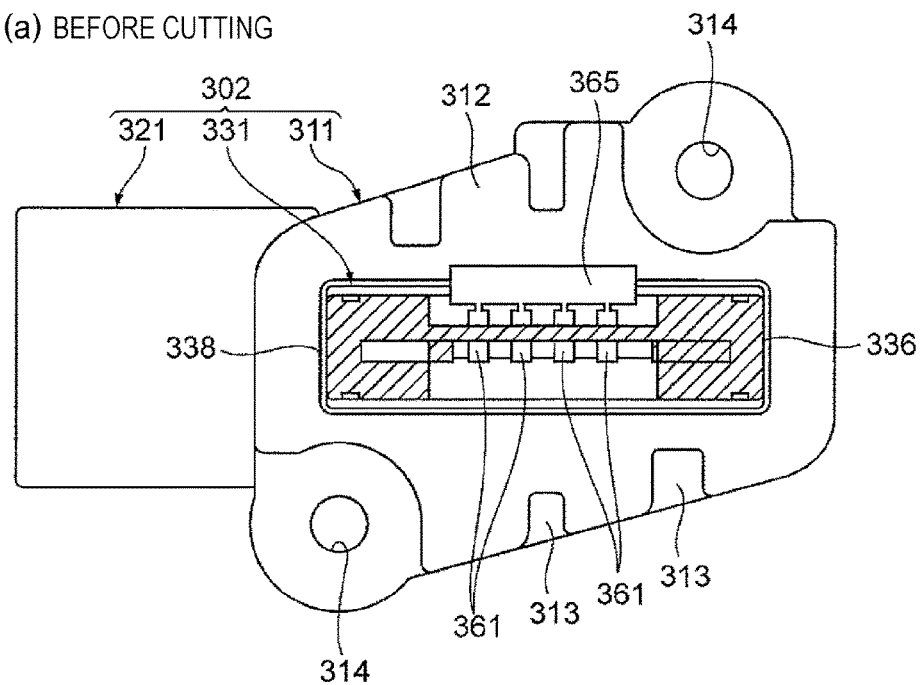
FIG. 9D is a IXd-IXd line sectional view of FIG. 9B.
Figure 9D:
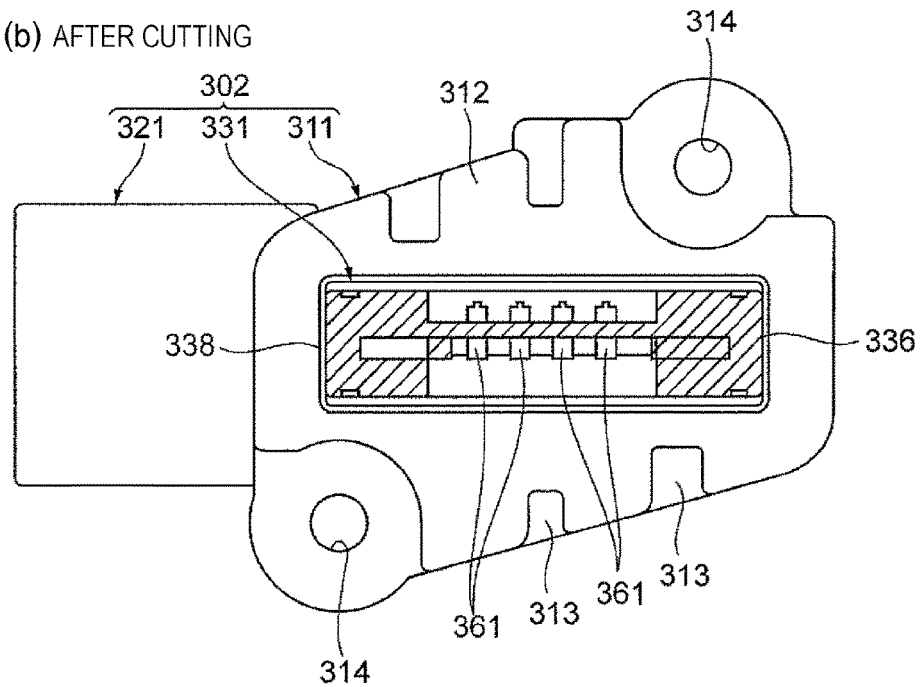

Next, the structure of a terminal connector will be described below using FIGS. 9A to 9D. FIG. 9A illustrates the structure of the terminal connector. FIG. 9B illustrates the structure of the terminal connector. FIG. 9C is a IXc-IXc line sectional view of FIG. 9A. FIG. 9D is a IXd-IXd line sectional view of FIG. 9B.

In the terminal connector 320, an inner end portion 361 of the external terminal 323 and a connection terminal 412 of the circuit substrate 400 are connected with a metal wire 413. As illustrated in FIG. 9A, the inner end portions 361 of the external terminals 323 protrude into the circuit chamber Rc from the side of the flange 311, and are disposed side by side at predetermined intervals according to the positions of the connection terminals 412 of the circuit substrate 400.

The inner end portion 361 is disposed at a position which is substantially flush with the surface of the circuit substrate 400, as illustrated in FIG. 9C. The leading end of the inner end portion 361 is bent in an almost L shape from the surface of the measuring portion 331 toward the rear surface side, and protrudes to the rear surface of the measuring portion 331. As illustrated in FIG. 9D(a), the leading ends of the inner end portions 361 are joined to a joining portion 365. As illustrated in FIG. 9D(b), the joining portion 365 is separated after mold forming, and the inner end portions 361 are separately divided.

Each inner end portion 361 is fixed to the housing 302 through resin molding in a molding process such that the inner end portion 361 and the circuit substrate 400 are disposed on the same plane. The inner end portions 361 are fixed to the housing 302 through a resin molding process in a state where the inner end portions 361 are integrally joined by the joining portion 365 in order to prevent deformation and a deviation of arrangement. After the inner end portions 361 are fixed to the housing 302, the joining portion 365 is separated.

The inner end portion 361 is resin-molded in a state where the inner end portion 361 is sandwiched from the surface side and the rear surface side of the measuring portion 331. In this case, a die is made to abut on the entire surface of the inner end portion 361, and the fixing pin is made to abut on the rear surface of the inner end portion 361. Therefore, the surface of the inner end portion 361 to which the metal wire is welded can be completely exposed without being covered with a mold resin due to resin leakage, so that the metal wire can be easily welded. A pin hole 340 provided by pressing the inner end portion 361 with the fixing pin is formed in the measuring portion 331.

The leading end of the inner end portion 361 protrudes into a recessed portion 341 formed in the rear surface of the measuring portion 331. The recessed portion 341 is covered with the rear cover 304, and the circumference of the recessed portion 341 is continuously joined to the rear cover 304 by laser welding or the like to form the sealed chamber space. This can prevent the corrosion of the inner end portion 361 caused by the contact of the inner end portion 361 with the measurement target gas 30.

4. Exterior of Circuit Substrate 400

4.1 Formation of Measurement Flow Passage Surface 430 Having Flow Rate Detection Portion 602

The exterior of the circuit substrate 400 is illustrated in FIGS. 7A to 7F. A hatching portion described on the exterior of the circuit substrate 400 indicates fixation surfaces 432 and 434 where the circuit substrate 400 is covered by the resin when the housing 302 is formed through the resin molding process.

Figure 7A:
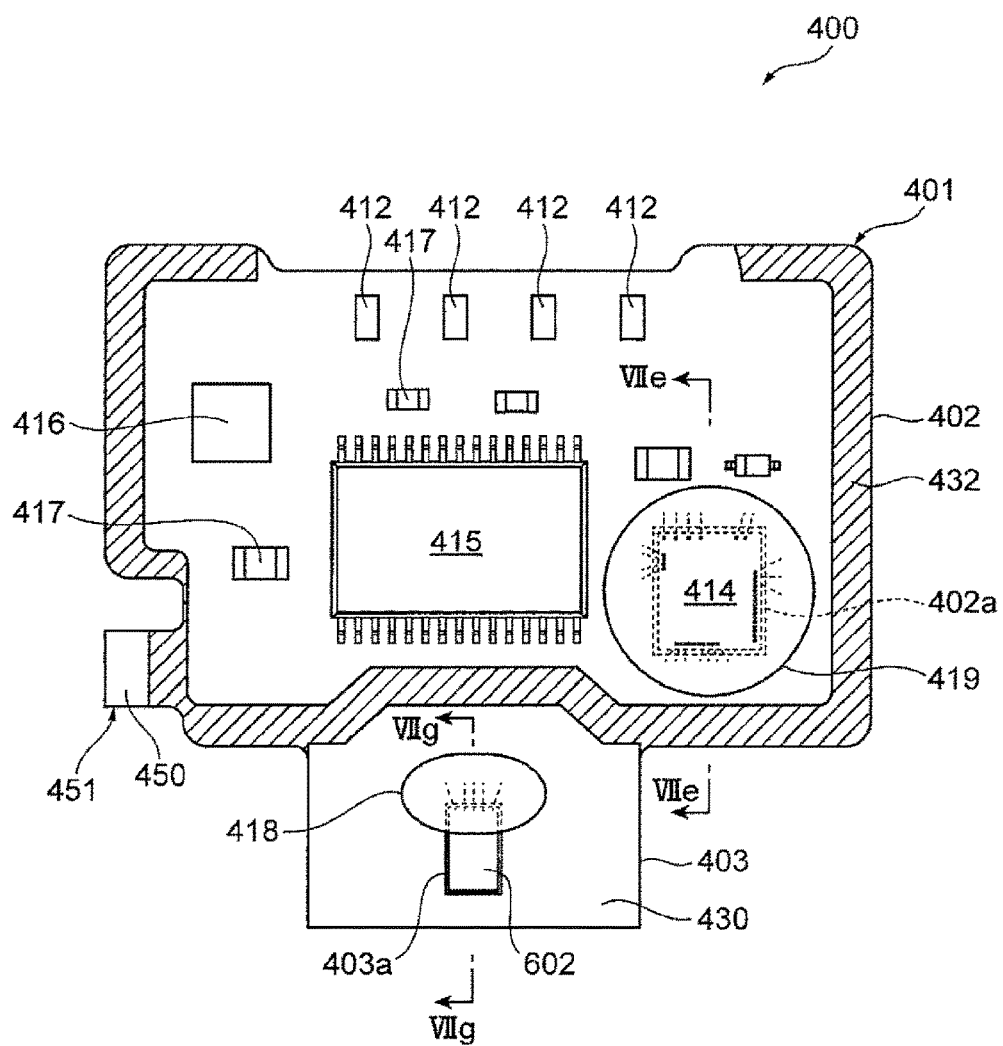
FIG. 7A is a front view of a circuit substrate.
Figure 7B:
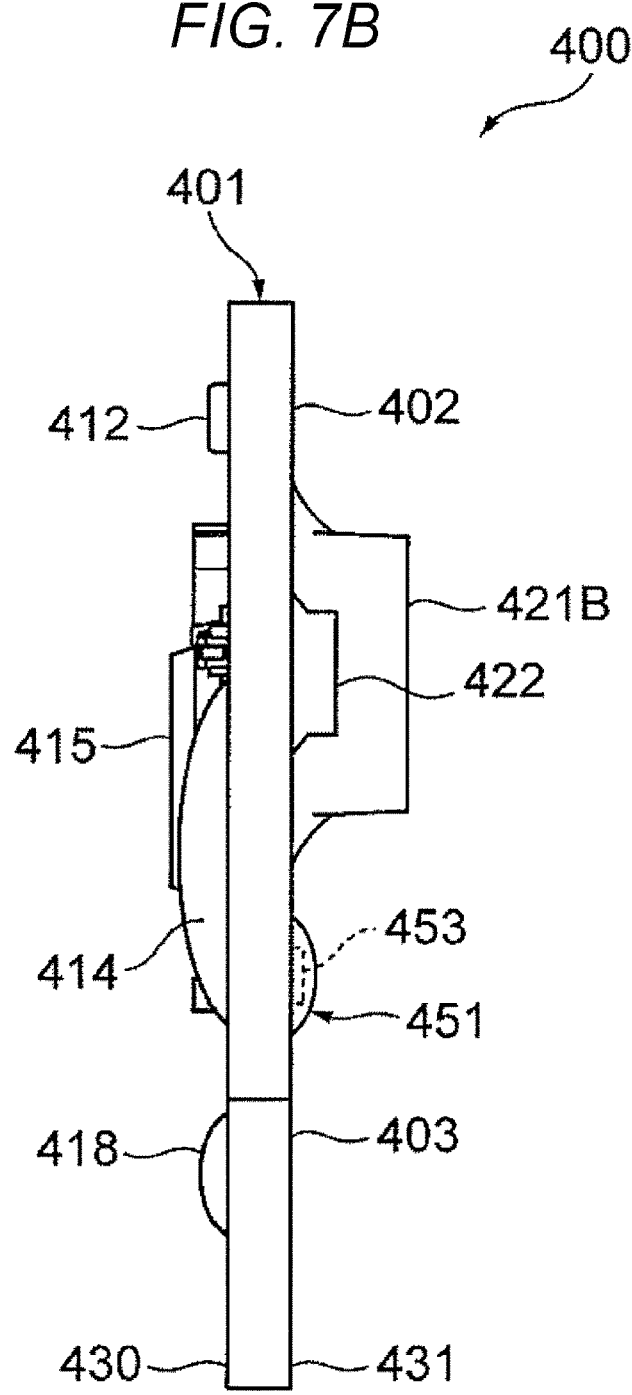
FIG. 7B is aright side view of the circuit substrate.
Figure 7C:
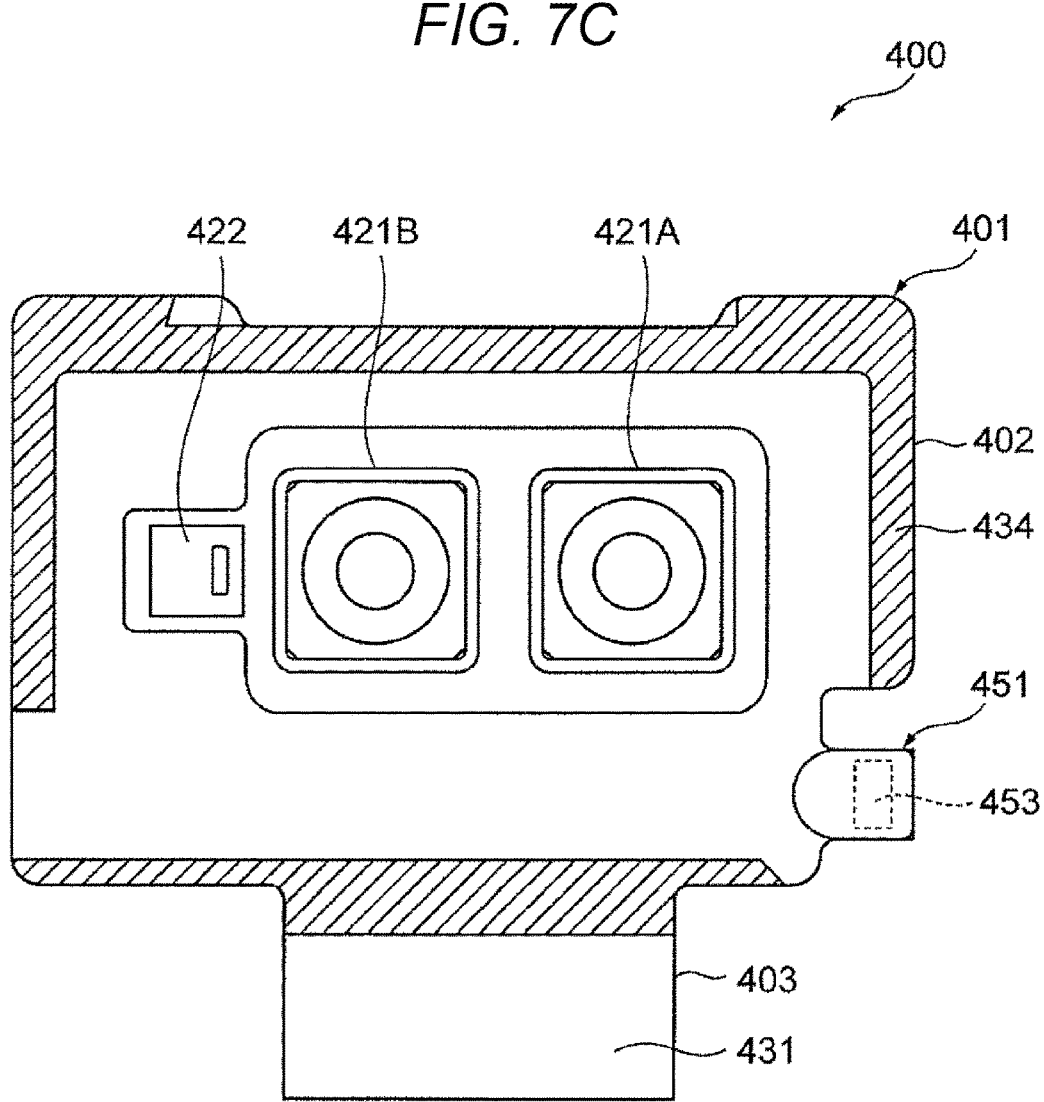
FIG. 7C is a rear view of the circuit substrate.
Figure 7D:
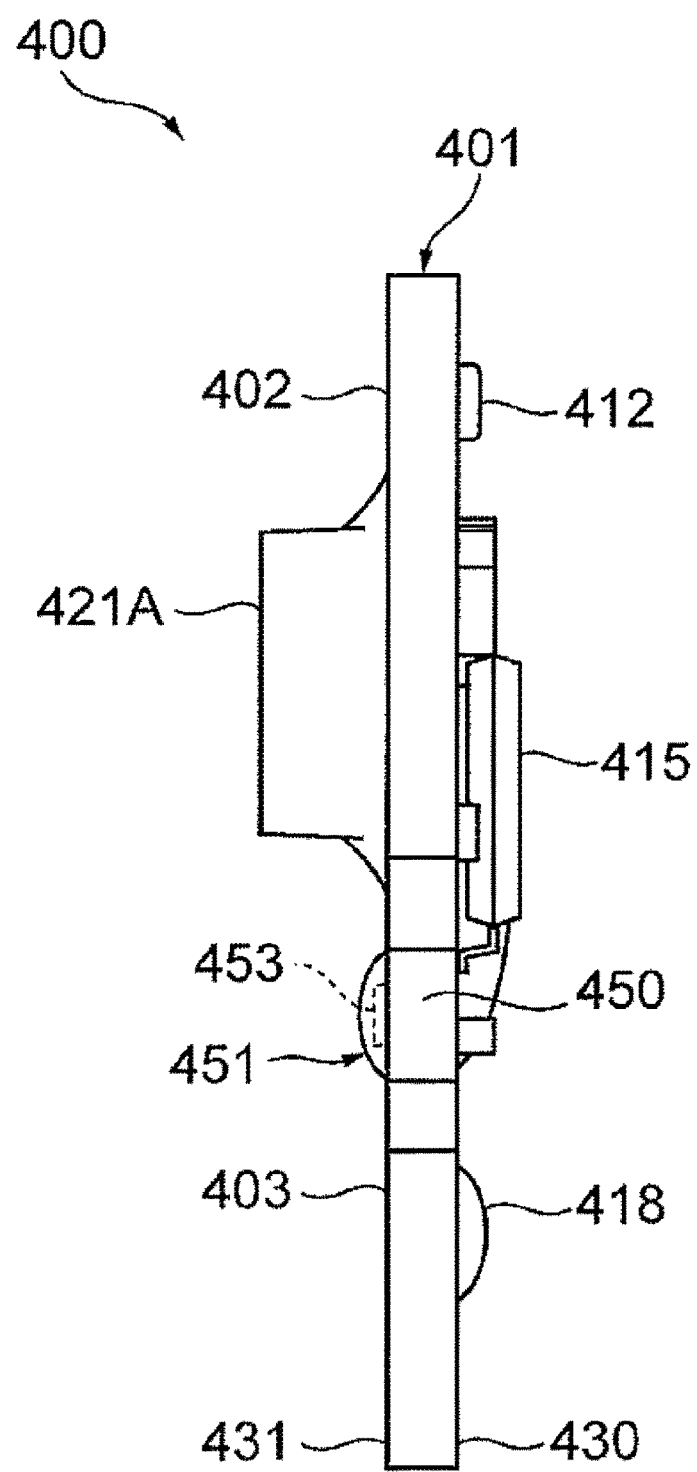
FIG. 7D is a left side view of the circuit substrate.
Figure 7E:
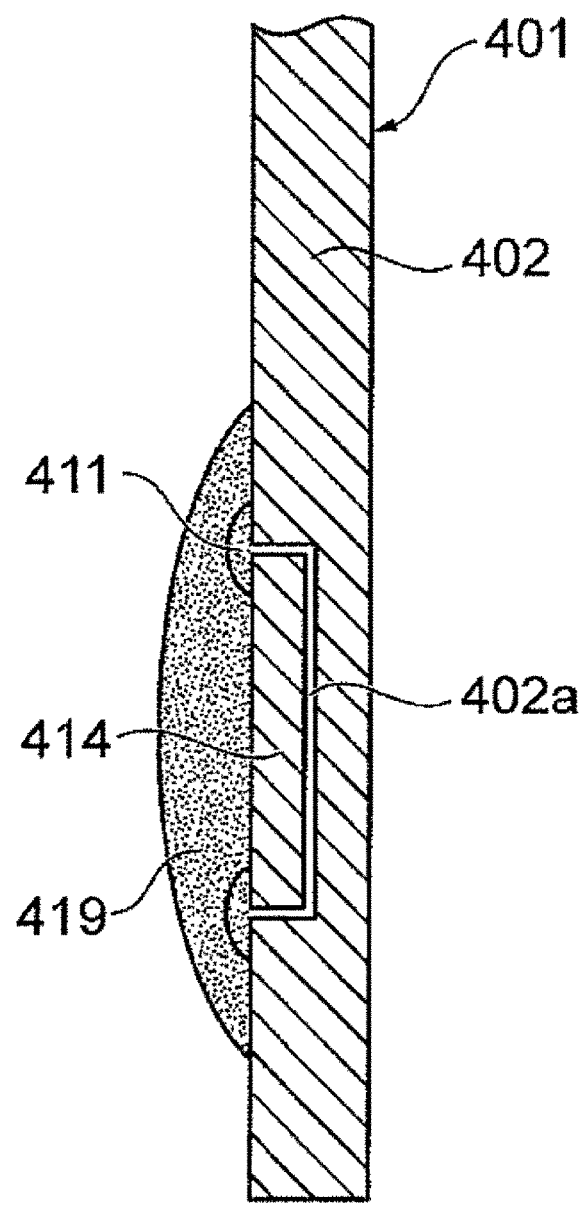
FIG. 7E is a VIIe-VIIe line sectional view of FIG. 7A.
Figure 7F:
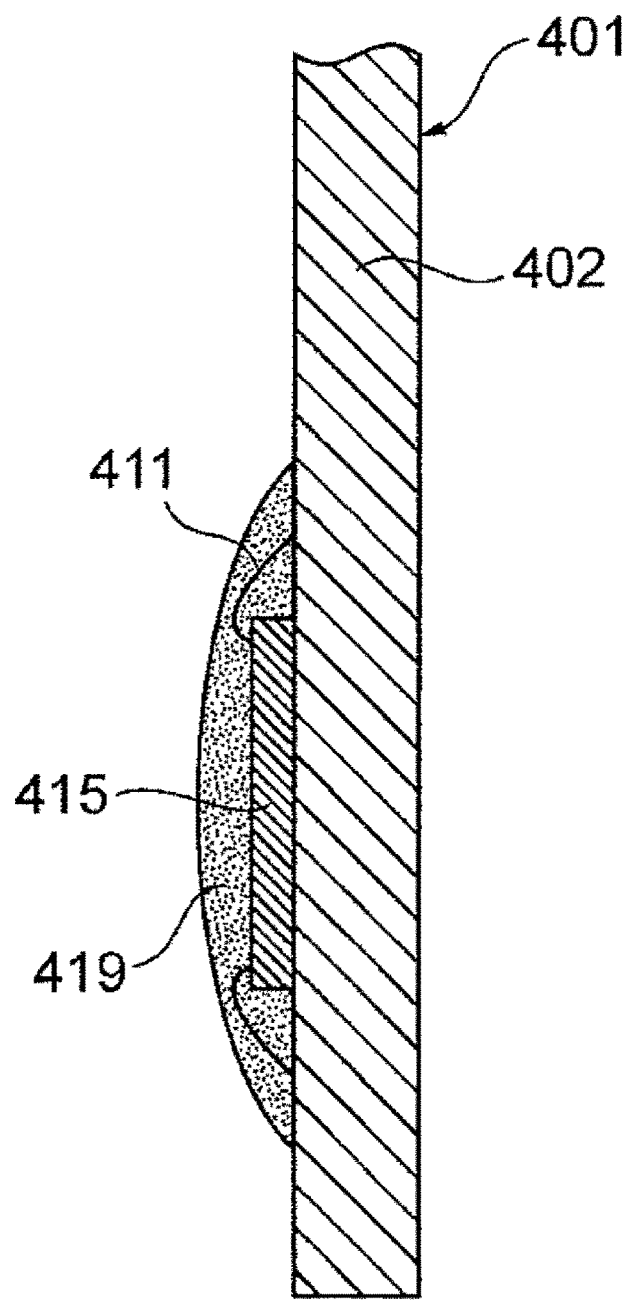
FIG. 7F illustrates another embodiment corresponding to the VIIe-VIIe line section of FIG. 7A.
Figure 7G:
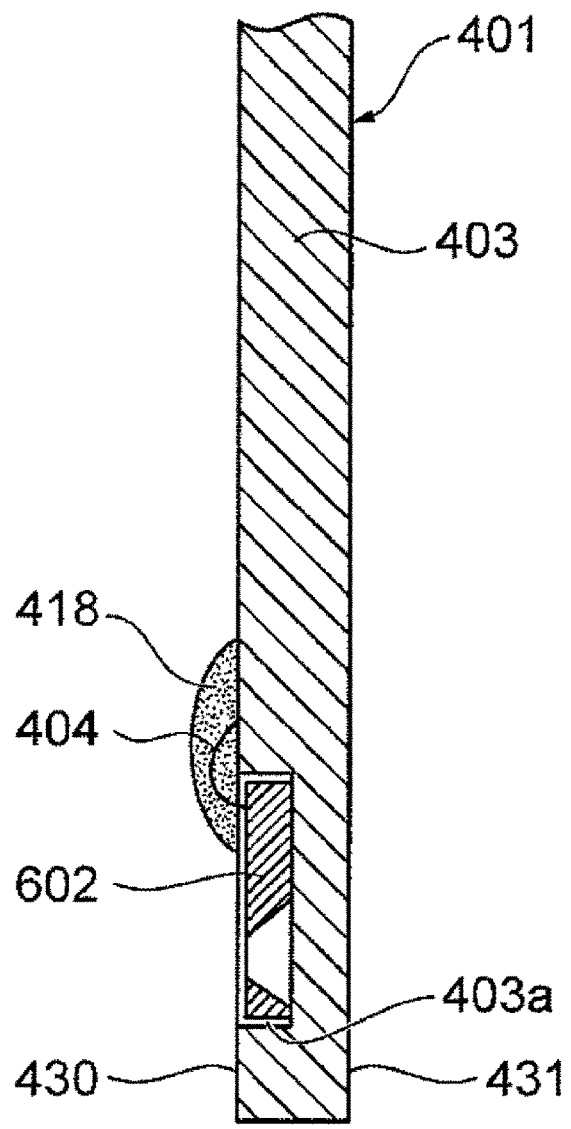
FIG. 7G is a VIIg-VIIg line sectional view of FIG. 7A.

FIG. 7A is a front view of the circuit substrate, FIG. 7B is a right side view of the circuit substrate, FIG. 7C is a rear view of the circuit substrate, FIG. 7D is a left side view of the circuit substrate, FIG. 7E is a VIIe-VIIe line sectional view illustrating the section of an LSI portion of FIG. 7A, FIG. 7F illustrates another embodiment corresponding to the VIIe-VIIe line section of FIG. 7A, and FIG. 7G is a VIIg-VIIg line sectional view of FIG. 7A.

The circuit substrate 400 includes the substrate body 401, and the circuit portion and the flow rate detection portion 602 as a sensing element are provided on the surface of the substrate body 401. The pressure sensor 421 and the humidity sensor 422 as a sensing element are provided on the rear surface of the substrate body 401. The substrate body 401 is made of a glass epoxy resin material, and has a thermal expansion coefficient which is the same as, or approximates the thermal expansion coefficient of a thermoplastic resin contained in the housing 302. Therefore, when the circuit substrate 400 is insert-molded on the housing 302, a stress caused by a difference between the thermal expansion coefficients can be reduced, so that the strain of the circuit substrate 400 can be decreased.

The substrate body 401 has a plate shape having a predetermined thickness, and includes the base portion 402 having an almost quadrilateral shape, and the protrusion 403 protruding from one side of the base portion 402, being slightly smaller than the base portion 402, and having an almost quadrilateral shape. The substrate body 401 has an almost T shape in plan view. The circuit portion is provided on the surface of the base portion 402. The circuit portion is constituted by mounting electronic parts such as a chip component 417 (e.g., an LSI 414, a microcomputer 415, a power regulator 416, a resistor, or a capacitor) on a circuit wiring which is not illustrated. Since the power regulator 416 has a heat amount more than that of the electronic part such as the microcomputer 415 or the LSI 414, the power regulator 416 is disposed on a comparatively upstream side in the circuit chamber Rc. The entire LSI 414, including a metal wire 411, is sealed with a synthetic resin material 419, so that the handling property of the circuit substrate 400 during insert molding is improved.

As illustrated in FIG. 7E, a recessed portion 402a into which the LSI 414 is fitted is formed in the surface of the substrate body 401. The recessed portion 402*a* can be formed by subjecting the substrate body 401 to laser beam machining. The substrate body 401 made of a glass epoxy resin is easily processed as compared with a ceramic substrate body, so that the recessed portion 402*a* can be easily provided. The recessed portion 402*a* has such a depth that the surface of the LSI 414 is flush with the surface of the substrate body 401. Thus, by matching the height of the surface of the LSI 414 to the height of the surface of the substrate body 401, the LSI 414 and the substrate body 401 are easily connected by wire bonding using the metal wire 411, so that the circuit substrate 400 is easily manufactured. For example, as illustrated in FIG. 7F, the LSI 414 can also be directly provided on the surface of the substrate body 401. In the case of the structure, the synthetic resin material 419 covering the LSI 414 more largely protrudes, but it is unnecessary to form the recessed portion 402*a* in the substrate body 401, so that the manufacture can be simplified.

The protrusion 403 is disposed in the first bypass passage 305 when the circuit substrate 400 is insert-molded on the housing 302, and the measurement flow passage surface 430 as the surface of the protrusion 403 extends along the flow direction of the measurement target gas 30. The flow rate detection portion 602 is provided on the measurement flow passage surface 430 of the protrusion 403. The flow rate detection portion 602 performs heat transfer to the measurement target gas 30 to measure the condition of the measurement target gas 30 such as the flow velocity of the measurement target gas 30 and output an electric signal representing the flow rate of the main passage 124. In order to measure the condition of the measurement target gas 30 with high accuracy using the flow rate detection portion 602, the gas flowing through the vicinity of the measurement flow passage surface 430 desirably makes a laminar flow having a little vortex. For this reason, it is desirable that the surface of the flow rate detection portion 602 and the surface of the measurement flow passage surface 430 are flush with each other, or a difference between the surfaces is equal to or less than a predetermined value.

A recessed portion 403*a* is formed in the surface of the measurement flow passage surface 430, and the flow rate detection portion 602 is fitted into the recessed portion 403*a*. The recessed portion 403*a* can also be formed by laser beam machining. The recessed portion 403*a* has such a depth that the surface of the flow rate detection portion 602 is flush with the surface of the measurement flow passage surface 430. The flow rate detection portion 602 is electrically connected to the circuit substrate 400 by the metal wire (connection wire) 404.

A connection terminal is provided in an end portion of the flow rate detection portion 602 on the side of the separating wall 335. In the circuit substrate 400, a connection terminal (not illustrated) is provided at a position near the connection terminal of the flow rate detection portion 602 on the surface of the substrate body 401. The metal wire 404 connects the connection terminal of the flow rate detection portion and the connection terminals of the circuit substrate to each other.

The flow rate detection portion 602 and the connected portion as the wiring portion thereof are covered with the synthetic resin material 418, so that electric corrosion caused by the adhesion of salt water is prevented. The connected portion is sealed by applying the synthetic resin material 418 to the connected portion of the flow rate detection portion 602 including the metal wire 404 and the circuit substrate 400 and curing the synthetic resin material 418. The flow rate detection portion 602 and the synthetic resin material 418 are disposed side by side along a direction crossing the flow direction of the measurement target gas 30 passing through the first bypass passage 305 on the substrate surface of the substrate body 401.

Two pressure sensors 421A and 421B and one humidity sensor 422 are formed on the rear surface of the substrate body 401. The two pressure sensors 421A and 421B are disposed in line in a state where the pressure sensors 421A and 421B are divided into an upstream side and a downstream side. The humidity sensor 422 is disposed on the downstream side of the pressure sensor 421B. The two pressure sensors 421A and 421B and the one humidity sensor 422 are disposed in the sensor chamber Rs. The case where the two pressure sensors 421A and 421B and the one humidity sensor 422 are provided is described in the embodiment illustrated in FIG. 7C, but as illustrated in FIG. 8B(a), only the pressure sensor 421B and the humidity sensor 422 may be provided. As illustrated in FIG. 8C(a), only the humidity sensor 422 may be provided.

In the circuit substrate 400, the secondary bypass passage 306 is disposed on the rear surface side of the substrate body 401. Therefore, the entire substrate body 401 can be cooled by the measurement target gas 30 passing through the secondary bypass passage 306.

4.2 Structure of Temperature Detecting Portion 451

The temperature detecting portion 451 is provided in a corner portion located on the side of the protrusion 403 on the upstream side end side of the base portion 402. The temperature detecting portion 451 constitutes one of detecting portions for detecting the physical quantity of the measurement target gas 30 flowing through the main passage 124, and is provided on the circuit substrate 400. The circuit substrate 400 includes a protrusion 450 protruding toward the upstream side of the measurement target gas 30 from the secondary bypass passage inlet port 306*a* of the secondary bypass passage 306, and the temperature detecting portion 451 includes a chip type temperature sensor 453 provided on the protrusion 450 and the rear surface of the circuit substrate 400. The temperature sensor 453 and the wiring portion thereof are covered with the synthetic resin material, so that electric corrosion caused by the adhesion of salt water is prevented.

For example, as illustrated in FIG. 3B, the upstream side outer wall 336 in the measuring portion 331 included in the housing 302 is hollowed toward the downstream side in the center portion of the measuring portion 331 in which the secondary bypass passage inlet port 306*a* is provided. The protrusion 450 of the circuit substrate 400 protrudes toward the upstream side from the upstream side outer wall 336 having the hollow shape. The leading end of the protrusion 450 is disposed at a position hollowed from the most upstream side surface of the upstream side outer wall 336. The temperature detecting portion 451 is provided on the protrusion 450 so as to face the rear surface of the circuit substrate 400, i.e., the side of the secondary bypass passage 306.

Since the secondary bypass passage inlet port 306*a* is formed on the downstream side of the temperature detecting portion 451, the measurement target gas 30 flowing into the secondary bypass passage 306 from the secondary bypass passage inlet port 306*a* is brought into contact with the temperature detecting portion 451, and then flows into the secondary bypass passage inlet port 306*a*. A temperature is detected when the measurement target gas 30 is brought into contact with the temperature detecting portion 451. The measurement target gas 30 brought into contact with the temperature detecting portion 451 flows into the secondary bypass passage 306 from the secondary bypass passage inlet port 306a as it is, passes through the secondary bypass passage 306, and is discharged into the main passage 124 from the secondary passage outlet port 306b.

5. Circuit Configuration of Physical Quantity Detection Device 300

5.1 Entire Circuit Configuration of Physical Quantity Detection Device 300

Figure 10A:
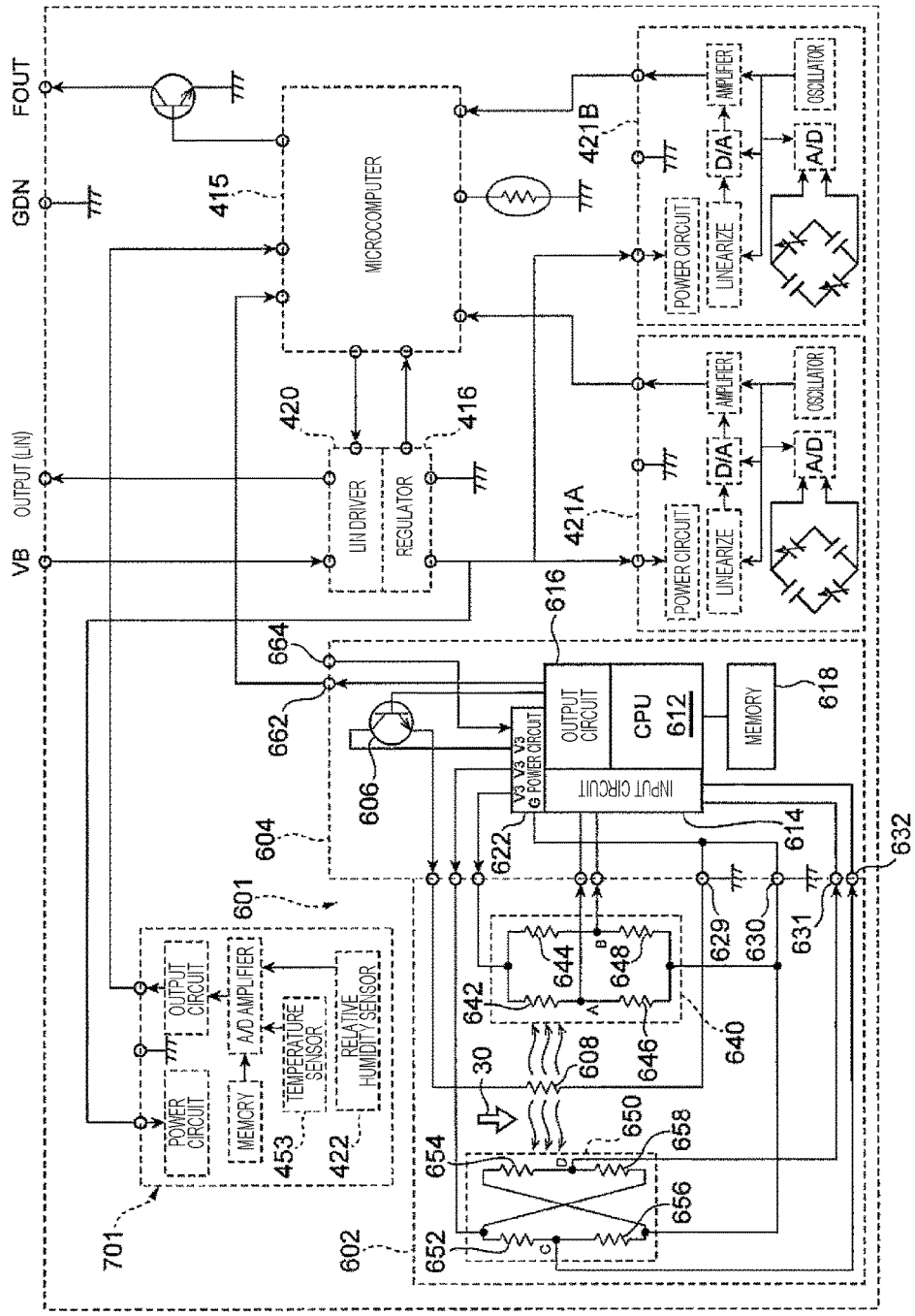
FIG. 10A illustrates an example of a circuit configuration of the physical quantity detection device.

FIG. 10A is a circuit diagram of the physical quantity detection device 300. The physical quantity detection device 300 includes a flow rate detection circuit 601 and a temperature-humidity detection circuit 701.

The flow rate detection circuit 601 includes the flow rate detection portion 602 having a heat generator 608 and a processing unit 604. The processing unit 604 controls the heat amount of the heat generator 608 of the flow rate detection portion 602 and outputs a signal representing the flow rate to the microcomputer 415 through a terminal 662 based on the output of the flow rate detection portion 602. For this processing, the processing unit 604 includes a central processing unit (hereinafter, referred to as "CPU") 612, an input circuit 614, an output circuit 616, a memory 618 for storing data representing a relationship between the calibration value or the measurement value and the flow rate, and a power circuit 622 for supplying a certain voltage to each necessary circuit. The power circuit 622 is supplied with DC power from an external power supply such as a vehicle-mount battery through a terminal 664 and a ground terminal (not illustrated).

The flow rate detection portion 602 is provided with a heat generator 608 for heating the measurement target gas 30. A voltage V1 is supplied from the power circuit 622 to a collector of a transistor 606 included in a current supply circuit of the heat generator 608, and a control signal is applied from the CPU 612 to a base of the transistor 606 through the output circuit 616. Based on this control signal, a current is supplied from the transistor 606 to the heat generator 608 through a terminal 624. The current amount supplied to the heat generator 608 is controlled by a control signal applied from the CPU 612 to the transistor 606 of the current supply circuit of the heat generator 608 through the output circuit 616. The processing unit 604 controls the heat amount of the heat generator 608 such that the temperature of the measurement target gas 30 increases by a predetermined temperature, for example, 100° C. from an initial temperature by heating using the heat generator 608.

The flow rate detection portion 602 includes a heating control bridge 640 for controlling the heat amount of the heat generator 608 and a flow rate sensing bridge 650 for measuring a flow rate. A predetermined voltage V3 is supplied to one end of the heating control bridge 640 from the power circuit 622 through a terminal 626, and the other end of the heating control bridge 640 is connected to a ground terminal 630. A predetermined voltage V2 is applied to one end of the flow rate sensing bridge 650 from the power circuit 622 through a terminal 625, and the other end of the flow rate sensing bridge 650 is connected to the ground terminal 630.

The heating control bridge 640 has a resistor 642 which is a resistance temperature detector having a resistance value changing depending on the temperature of the heated measurement target gas 30, and the resistors 642, 644, 646, and 648 constitute a bridge circuit. A potential difference between a node A between the resistors 642 and 646 and a node B between the resistors 644 and 648 is input to the input circuit 614 through the terminals 627 and 628, and the CPU 612 controls the current supplied from the transistor 606 to control the heat amount of the heat generator 608 such that the potential difference between the nodes A and B is set to a predetermined value, for example, zero voltage in this embodiment. The flow rate detection circuit 601 illustrated in FIG. 10A heats the measurement target gas 30 using the heat generator 608 such that a temperature increases by a predetermined temperature, for example, 100° C. from the initial temperature of the measurement target gas 30 at all times. In order to perform this heating control with high accuracy, the resistance value of each resistor of the heating control bridge 640 is set such that the potential difference between the nodes A and B becomes zero when the temperature of the measurement target gas 30 heated by the heat generator 608 increases by a predetermined temperature, for example, 100° C. from the initial temperature at all times. Therefore, in the flow rate detection circuit 601, the CPU 612 controls the electric current supplied to the heat generator 608 such that the potential difference between the nodes A and B becomes zero.

The flow rate sensing bridge 650 includes four resistance temperature detectors of resistors 652, 654, 656, and 658. The four resistance temperature detectors are disposed along the flow of the measurement target gas 30 such that the resistors 652 and 654 are disposed on the upstream side in the flow path of the measurement target gas 30 with respect to the heat generator 608, and the resistors 656 and 658 are disposed on the downstream side in the flow path of the measurement target gas 30 with respect to the heat generator 608. In order to increase the measurement accuracy, the resistors 652 and 654 are disposed such that distances to the heat generator 608 are approximately equal, and the resistors 656 and 658 are disposed such that distances to the heat generator 608 are approximately equal.

A potential difference between a node C between the resistors 652 and 656 and a node D between the resistors 654 and 658 is input to the input circuit 614 through the terminals 631 and 632. In order to increase the measurement accuracy, each resistance of the flow rate sensing bridge 650 is set, for example, such that a positional difference between the nodes C and D is set to zero while the flow of the measurement target gas 30 is set to zero. Therefore, while the potential difference between the nodes C and D is set to, for example, zero, the CPU 612 outputs, from the terminal 662, an electric signal indicating that the flow rate of the main passage 124 is zero based on the measurement result that the flow rate of the measurement target gas 30 is zero.

When the measurement target gas 30 flows along the arrow direction in FIG. 10A, the resistor 652 or 654 disposed on the upstream side is cooled by the measurement target gas 30, and the resistors 656 and 658 disposed on the downstream side of the measurement target gas 30 are heated by the measurement target gas 30 heated by the heat generator 608, so that the temperature of the resistors 656 and 658 increases. For this reason, a potential difference is generated between the nodes C and D of the flow rate sensing bridge 650, and this potential difference is input to the input circuit 614 through the terminals 631 and 632. The CPU 612 searches data indicating a relationship between the flow rate of the main passage 124 and the potential difference stored in the memory 618 based on the potential difference between the nodes C and D of the flow rate sensing bridge 650 to obtain the flow rate of the main passage 124. An electric signal indicating the flow rate of the main passage 124 obtained in this manner is output through the terminal 662. Although the terminals 664 and 662 illustrated in FIG. 10A are denoted by new reference numerals, they are included in the connection terminal 412 of FIG. 7A described above.

The memory 618 stores the data indicating a relationship between the potential difference between the nodes C and D and the flow rate of the main passage 124 and calibration data for reducing a measurement error such as a variation, obtained based on the actual measurement value of the gas after the production of the circuit substrate 400.

The temperature-humidity detection circuit 701 includes an input circuit for inputting detection signals from the temperature sensor 453 and the humidity sensor 422 such as an A/D amplifier, an output circuit, a memory for storing data representing a relationship between the calibration value or the temperature and the absolute humidity, and a power circuit 622 for supplying a certain voltage to each necessary circuit. The signals output from the flow rate detection circuit 601 and the temperature-humidity detection circuit 701 are input into the microcomputer 415. The microcomputer 415 includes a flow rate calculator, a temperature calculator, and an absolute humidity calculator, computes a flow rate, a temperature, and absolute humidity which are the physical quantities of the measurement target gas 30 based on the signals, and outputs them to an ECU 200.

The physical quantity detection device 300 and the ECU 200 are connected with the telecommunication cable for communication using digital signals according to telecommunication standards such as SENT, LIN, and CAN. In this embodiment, signals are input into a LIN driver 420 from the microcomputer 415 for LIN communication from the LIN driver 420. Information output to the ECU 200 from the LIN driver of the physical quantity detection device 300 is output in a superimposed manner according to digital communication using a single or two-wire telecommunication cable.

The absolute humidity calculator of the microcomputer 415 computes absolute humidity based on the relative humidity information output from the humidity sensor 422 and the temperature information, and corrects the absolute humidity based on an error. The corrected absolute humidity computed by the absolute humidity calculator is used in various types of engine operation control performed by a control portion 62 of an ECU 18. The ECU 18 can also directly use total error information for various types of engine operation control.

Figure 10B:
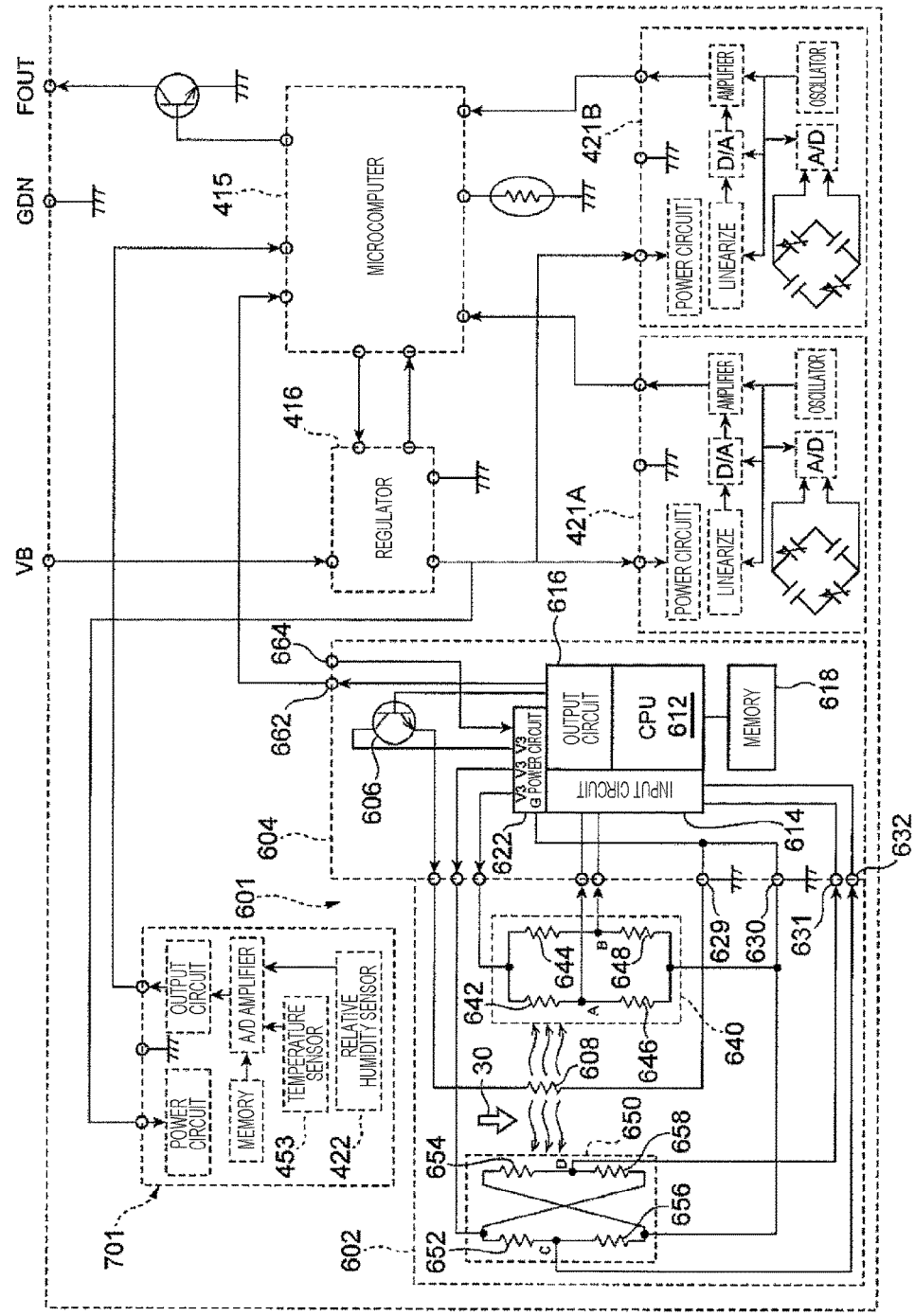
FIG. 10B illustrates another embodiment of the circuit configuration of the physical quantity detection device.

The case where the physical quantity detection device 300 includes the LIN driver 420 for LIN communication is described in the embodiment illustrated in FIG. 10 without limitation. As illustrated in FIG. 10B, direct communication with the microcomputer 415 may be performed without using LIN communication.

While the embodiments of the present invention have been described above in detail, the present invention is not limited to the embodiments, and various changes in design can be made within a range not deviating from the spirit of the claims of the present invention. For example, the embodiments described above have been described in detail to clearly explain the present invention, and the present invention is not limited to those having the entire configurations described above. A part of the configuration of an embodiment is replaceable with a part of the configuration of another embodiment, and a part of the configuration of an embodiment can be added to a part of the configuration of another embodiment. Further, with respect to a part of the configuration of each embodiment, addition of another configuration, deletion, and replacement can be made.

REFERENCE SIGNS LIST 30 measurement target gas
124 main passage
300 physical quantity detection device
302 housing
303 front cover
304 rear cover
332 front side bypass passage trench
333 opening
335 separating wall
353 protrusion
354 slope portion
356 orifice portion
400 circuit substrate
404 metal wire (connection wire)
418 synthetic resin material
421A, 421B pressure sensor
422 humidity sensor
602 flow rate detection portion (sensor element)

The invention claimed is:

1. A physical quantity detection device for detecting a physical quantity of a measurement target gas passing through a main passage, the physical quantity detection device comprising:
a housing inserted into the main passage;
a cover fixed to the housing to constitute a bypass passage into which a part of the measurement target gas flows from the main passage in cooperation with the housing;
a circuit substrate accommodated in the housing to be exposed into the bypass passage;
a sensor element attached to the circuit substrate to detect a flow rate of the measurement target gas in the bypass passage;
a connection wire electrically connecting the sensor element to the circuit substrate; and
a synthetic resin material applied to a connected portion of the sensor element including the connection wire and the circuit substrate and cured to seal the connected portion,
wherein the cover includes a protrusion protruding into the bypass passage to cover at least a part of the synthetic resin material.

2. The physical quantity detection device according to claim 1, wherein:
the circuit substrate is disposed along a flow direction of the measurement target gas passing through the bypass passage; and
the synthetic resin material is disposed in a direction crossing the flow direction of the measurement target gas passing through the bypass passage with respect to the sensor element on a substrate surface of the circuit substrate.

3. The physical quantity detection device according to claim 2, wherein:
the synthetic resin material has a shape having a step protruding from the circuit substrate; and
the protrusion includes a first opposed portion opposed to the synthetic resin material.

4. The physical quantity detection device according to claim 3, wherein the protrusion includes a second opposed portion opposed to the substrate surface of the circuit substrate between a separating wall included in the bypass passage and the synthetic resin material.

5. The physical quantity detection device according to claim 4, wherein the second opposed portion extends to an upstream side position in the flow direction of the measurement target gas passing through the bypass passage with respect to the synthetic resin material from between the separating wall and the synthetic resin material, or the upstream and downstream side positions in the flow direction.

6. The physical quantity detection device according to claim 5, wherein the second opposed portion includes a sloped surface sloped in a direction in which the sloped surface gradually approaches the sensor element as traveling to a downstream side in the flow direction on an upstream side in the flow direction of the measurement target gas with respect to the sensor element.

7. The physical quantity detection device according to claim 3, wherein:
   the cover includes an orifice portion for reducing a flow passage area of the bypass passage at a position opposed to the flow rate detection portion; and
   a minimal portion coming closest to the flow rate detection portion of the orifice portion and the first opposed portion form the same plane.

\* \* \* \* \*